US012133294B2

(12) United States Patent
Cheong et al.

(10) Patent No.: US 12,133,294 B2
(45) Date of Patent: *Oct. 29, 2024

(54) METHOD FOR ESTABLISHING WIRELESS COMMUNICATION LINK AND ELECTRONIC DEVICE SUPPORTING SAME

(71) Applicant: Samsung Electronics Co., Ltd., Suwon-si (KR)

(72) Inventors: Gupil Cheong, Suwon-si (KR); Doosuk Kang, Suwon-si (KR); Bokun Choi, Suwon-si (KR); Sungjun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 188 days.

This patent is subject to a terminal disclaimer.

(21) Appl. No.: 16/818,838

(22) Filed: Mar. 13, 2020

(65) Prior Publication Data

US 2020/0296793 A1    Sep. 17, 2020

(30) Foreign Application Priority Data

Mar. 15, 2019 (KR) .................. 10-2019-0030188

(51) Int. Cl.
*H04W 84/18* (2009.01)
*H04L 1/00* (2006.01)
(Continued)

(52) U.S. Cl.
CPC ........... *H04W 84/18* (2013.01); *H04L 1/0003* (2013.01); *H04L 1/0009* (2013.01); *H04W 4/80* (2018.02);
(Continued)

(58) Field of Classification Search
None
See application file for complete search history.

(56) References Cited

U.S. PATENT DOCUMENTS

| 6,510,454 B1 * | 1/2003 | Walukiewicz ...... H04L 41/0681 |
| | | 709/200 |
| 7,995,687 B2 | 8/2011 | Desai et al. |

(Continued)

FOREIGN PATENT DOCUMENTS

| CN | 105376637 A | 3/2016 | |
| CN | 109462894 A | 3/2019 | |
| TW | 201110767 A * | 3/2011 | ........ H04W 52/0216 |

OTHER PUBLICATIONS

Chaubey et al., Partitioned Proxy Server For Facilitating Power Conservation in Wireless Client Terminals, Mar. 16, 2011, English Translation of TW 201110767 A, (Year: 2011).*

(Continued)

*Primary Examiner* — Kenny S Lin
*Assistant Examiner* — Rodrick Mak

(57) ABSTRACT

An electronic device includes a wireless communication circuit and a processor. The processor is configured to establish a first communication link with a first external electronic device and establish a second communication link with a second external electronic device. The electronic device is also configured to transmit connection information associated with the first communication link to the second external electronic device and determine whether configuration information associated with an operation of the first communication link needs to be changed. The electronic device is configured to identify the first operation information of the electronic device for the first communication link and request second operation information of the second external electronic device for the first communication link. The electronic device is further configured to determine a change value of the configuration information and transmit the determined change value of the configuration information to the first external electronic device.

25 Claims, 13 Drawing Sheets

(51) Int. Cl.
    *H04W 4/80*    (2018.01)
    *H04W 8/00*    (2009.01)
    *H04W 76/14*    (2018.01)
    *H04W 88/06*    (2009.01)

(52) U.S. Cl.
    CPC ........... *H04W 8/005* (2013.01); *H04W 76/14* (2018.02); *H04W 88/06* (2013.01)

(56) References Cited

U.S. PATENT DOCUMENTS

| | | | | |
|---|---|---|---|---|
| 8,631,134 | B2* | 1/2014 | Ceragioli | H04L 63/20 709/227 |
| 11,818,636 | B2* | 11/2023 | Ryu | H04W 84/18 |
| 2006/0209826 | A1* | 9/2006 | Kawamura | H04L 45/16 370/390 |
| 2007/0076640 | A1 | 4/2007 | Bonta et al. | |
| 2007/0287418 | A1* | 12/2007 | Reddy | H04W 12/50 455/410 |
| 2009/0131071 | A1* | 5/2009 | Sako | H04M 1/72457 455/456.1 |
| 2010/0246514 | A1* | 9/2010 | Jeon | H04W 84/12 370/329 |
| 2013/0091238 | A1* | 4/2013 | Liu | H04W 4/80 709/217 |
| 2014/0064195 | A1 | 3/2014 | Li et al. | |
| 2016/0359699 | A1* | 12/2016 | Gandham | G06F 16/1744 |
| 2017/0094353 | A1* | 3/2017 | Chang | H04N 21/443 |
| 2017/0118619 | A1* | 4/2017 | Neth | H04W 8/22 |
| 2017/0164315 | A1* | 6/2017 | Smith | H04W 4/029 |
| 2017/0164318 | A1* | 6/2017 | Smith | G01S 19/46 |
| 2017/0228665 | A1* | 8/2017 | Levin | G06K 7/10722 |
| 2018/0049122 | A1 | 2/2018 | Di Marco et al. | |
| 2018/0092017 | A1* | 3/2018 | Freda | H04W 36/36 |
| 2018/0109999 | A1 | 4/2018 | Finnegan | |
| 2018/0124550 | A1 | 5/2018 | Kwon et al. | |
| 2018/0270934 | A1 | 9/2018 | Sugar et al. | |
| 2018/0359624 | A1 | 12/2018 | Polo et al. | |
| 2021/0092578 | A1* | 3/2021 | Ryu | H04R 1/1041 |

OTHER PUBLICATIONS

Kherani et al., "Power and QoS Optimization for BLE-based Accessory-Smartphone Communications", 2015 12th Annual IEEE Consumer Communications and Networking Conference (CCNC), Jan. 12, 2015, 6 pages.
International Search Report dated Jul. 2, 2020 in connection with International Patent Application No. PCT/KR2020/003487, 3 pages.
European Search Report dated Aug. 11, 2020 in connection with European Patent Application No. 20 16 3150, 5 pages.
Written Opinion of the International Searching Authority dated Jul. 2, 2020 in connection with International Patent Application No. PCT/KR2020/003487, 4 pages.
Communication pursuant to Article 94(3) EPC dated Mar. 12, 2021 in connection with European Patent Application No. 20 163 150.4, 4 pages.
Intellectual Property India, "Examination report under sections 12 &13 of the Patents Act," dated Mar. 7, 2022, in connection with Indian Patent Application No. 202117044918, 6 pages.
Office Action dated Oct. 23, 2023, in connection with Chinese Patent Application No. CN202010174482.8, 13 pages.
Notice of Allowance issued Apr. 16, 2024, in connection with Chinese Patent Application No. 202010174482.8, 6 pages.
Morozov et al., "Projects Change Management in Based on the Projects Configuration Management for Developing Complex Projects," 9th IEEE International Conference on Intelligent Data Acquisition and Advanced Computing Systems: Technology and Applications, Sep. 2017, Bucharest, Romania, 3 pages.

\* cited by examiner

METHOD FOR ESTABLISHING WIRELESS COMMUNICATION LINK AND ELECTRONIC DEVICE SUPPORTING SAME

CROSS-REFERENCE TO RELATED APPLICATION

This application is based on and claims priority under 35 U.S.C. 119 to Korean Patent Application No. 10-2019-0030188, filed on Mar. 15, 2019, in the Korean Intellectual Property Office, the disclosure of which is herein incorporated by reference in its entirety.

BACKGROUND

1. Field

Various embodiments of the disclosure relate to a technology for establishing a wireless communication link.

2. Description of Related Art

A Bluetooth wireless communication network can support a short range wireless communication between electronic devices. For example, the user device may search for external electronic devices that have entered a pairing mode among external electronic devices for the Bluetooth communication connection, and connect the Bluetooth communication to at least one external electronic device selected by the user among the searched external electronic devices. In addition, when the proximity of an external device having a pre-connected history is detected, the user device may automatically connect the Bluetooth communication to the corresponding external electronic device.

The Bluetooth topology may have the form of single Bluetooth chipset base and a plurality of independent Bluetooth chipset bases. At this time, in the form of a plurality of independent Bluetooth chipset bases, each Bluetooth devices may establish a separate communication like with the user device, one of the Bluetooth devices may establish a communication link with the user device and the other device may monitor the communication link. For example, communication between the Bluetooth chipsets may be connected in one of Bluetooth legacy and Bluetooth low energy (BLE), and in some cases, both may be used.

The state of a resource used to operate a communication link between a user terminal and external electronic devices connected by Bluetooth communication may be configured and changed. For example, the resource may include at least one of link operation elements defined by Bluetooth specification. The link operation element may, for example, include at least one of adaptive frequency hopping (AFH), power control, channel quality driven data rate change (CQDDR), link supervision timeout (LSTO), quality of service (QoS), control of multi-slot packets, or enhanced data rate.

The above information is presented as background information only to assist with an understanding of the disclosure. No determination has been made, and no assertion is made, as to whether any of the above might be applicable as prior art with regard to the disclosure.

SUMMARY

Among a plurality of independent Bluetooth chipset base types including a first Bluetooth device, which is directly connected to a user device (i.e., has a link ownership), and at least one second Bluetooth device, which is indirectly connected to the user device by monitoring a communication link between the user device and the first Bluetooth device directly connected to the user device, it may be difficult for a second Bluetooth device to directly configure or change the state of the resource of the first Bluetooth device or the user device used to operate the monitoring communication link. That is, when the user device or the first Bluetooth device changes the state of a resource of the user device or the first Bluetooth device used to operate the communication link due to a state change (e.g., a location change) between the user device and the first Bluetooth device, the state of a resource used by the second Bluetooth device to obtain data through the communication link may not be considered. In accordance with this, when the state of the resource of the user device or the first Bluetooth device is changed, a situation may occur in which the second Bluetooth device cannot acquired data through the communication link.

Various embodiments of the disclosure may provide, when configuring or changing a state of a resource used to operate a communication link between a user device and a first Bluetooth device, a method for configuring a wireless communication link that is configured or changed in consideration of a state of a resource of a second Bluetooth device that monitors a corresponding communication link, and an electronic device supporting the same.

In accordance with an aspect of the disclosure, an electronic device may include a wireless communication circuit and a processor, wherein the processor is configured to: establish a first communication link with a first external electronic device using the wireless communication circuit; establish a second communication link with a second external electronic device using the wireless communication circuit; transmit connection information associated with the first communication link to the second external electronic device via the second communication link; determine whether configuration information associated with an operation of the first communication link needs to be changed; identify the first operation information of the electronic device for the first communication link upon determination that the configuration information needs to be changed; request second operation information of the second external electronic device for the first communication link from the second external electronic device via the second communication link; determine whether to change the configuration information, based on the first operation information and the second operation information, in response to reception of the second operation information; determine a change value of the configuration information, based on the first operation information and the second operation information, on basis of the determination to change the configuration information; and transmit the determined change value of the configuration information to the first external electronic device via the first communication link.

In addition, an electronic device according to various embodiments of the disclosure may include may include a wireless communication circuit and a processor, wherein the processor may be configured to: establish a first communication link with a first external electronic device using the wireless communication circuit; receive connection information associated with a second communication link established between the first external electronic device and a second external electronic device via the first communication link; monitor the second communication link, based on the received connection information; receive a request for sharing first operation information of the electronic device for the second communication link via the first communication link; and transmit the first operation information to the first external electronic device via the first communication link.

In addition, an electronic device according to various embodiments of the disclosure may include a wireless communication circuit and a processor, wherein the processor may be configured to: establish a first communication link with a first external electronic device using the wireless communication circuit; establish a second communication link with a second external electronic device using the wireless communication circuit; transmit connection information associated with the first communication link to the second external electronic device via the second communication link; determine whether configuration information associated with an operation of the first communication link needs to be changed; determine a change value of the configuration information, upon determination whether the configuration information needs to be changed; and transmit the determined change value of the configuration information to the first external electronic device via the first communication link.

In addition, a configuration method of a wireless communication link according to various embodiments of the disclosure may include: an operation for establishing a first communication link by a user device and a first device; an operation for establishing a second communication link by the first device and a second device; an operation for transmitting, by the first device, connection information associated with the first communication link to the second device via the second communication link; an operation for monitoring, by the second device, the first communication link, based on the connection information; an operation for determining, by the first device, whether the configuration information associated with an operation of the first communication link needs to be changed; an operation for identifying the first operation information of the first device for the first communication link and requesting second operation information of the second device for the first communication link from the second device via the second communication link, by the first device if it is determined that the configuration information needs to be change; an operation for determining, by the first device, whether to change the configuration information, based on the first operation information and the second operation information, if the first device receives the second operation information from the second device; an operation for determining, by the first device, a change value of the configuration information, based on the first operation information and the second operation information, on the basis of determining of the change of the configuration information; and an operation for transmitting, by the first device, the determined change value of the configuration information to the user device via the first communication link.

According to various embodiment of the disclosure, when configuring or changing the state of a resource used to operate a communication link between the user device and the first Bluetooth device, not only the first Bluetooth device but also the second Bluetooth device can normally acquire data from the user device by considering the state of the resources of the second Bluetooth device monitoring the communication link.

In addition, according to various embodiment of the disclosure, the second Bluetooth device normally acquires data even if the state of the resource used to operate the communication link between the user device and the first Bluetooth device is changed, so that it is possible to prevent a decrease in communication performance caused by failing to acquire data, or waste of resources and unnecessary current consumption due to a decrease in communication performance.

In addition, various effects may be provided that are directly or indirectly identified through this document.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

In connection with the descriptions of figures, the same or similar reference numerals may be used for the same or similar elements.

DETAILED DESCRIPTION

Figure 1:
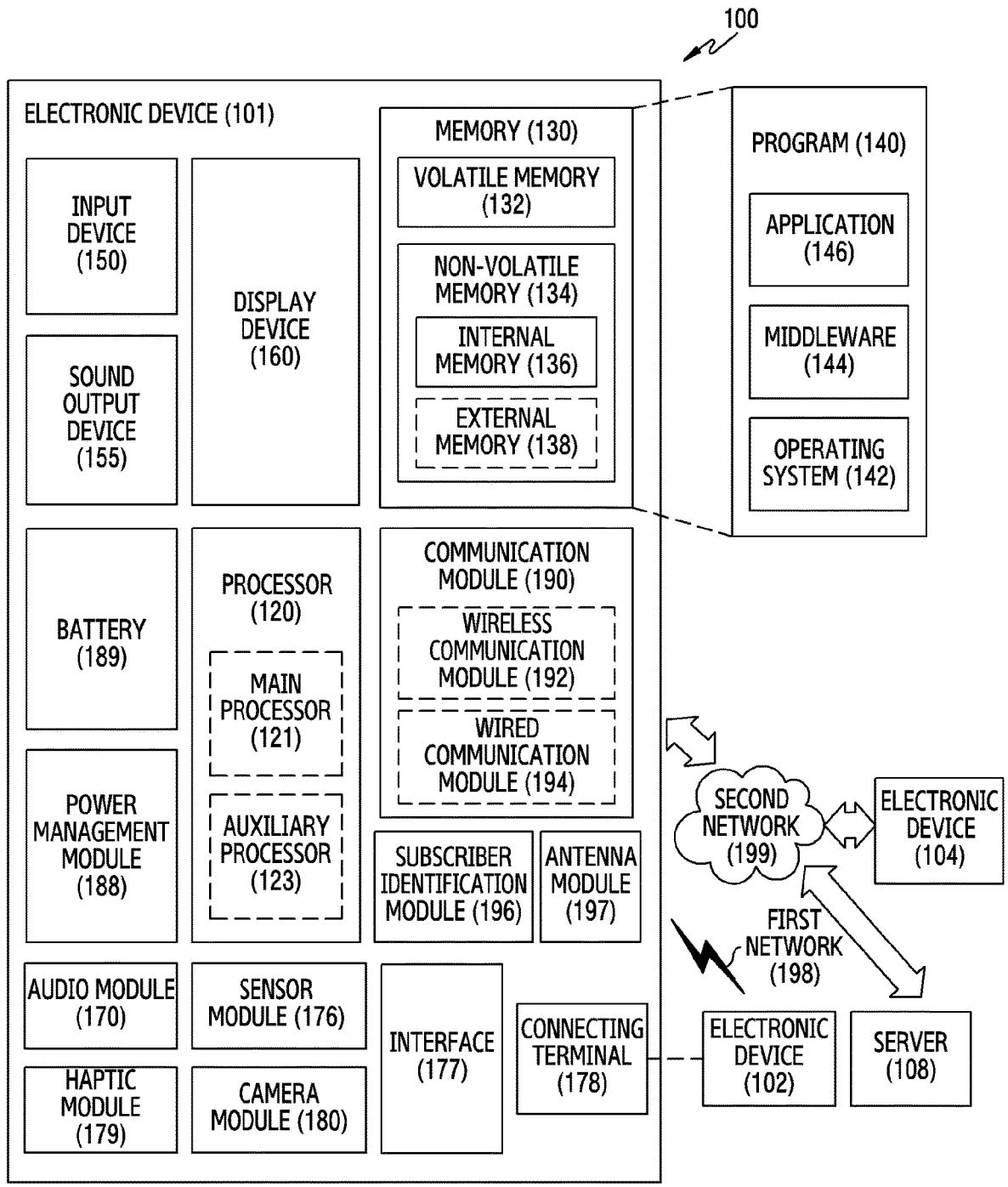
FIG. 1 illustrates a block diagram of an electronic device in a network environment according to various embodiments.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to the accompanying drawings. For convenience of description, the elements shown in the drawings may be exaggerated or reduced in size, and the disclosure is not necessarily limited to the illustrated.

FIG. 1 illustrates a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
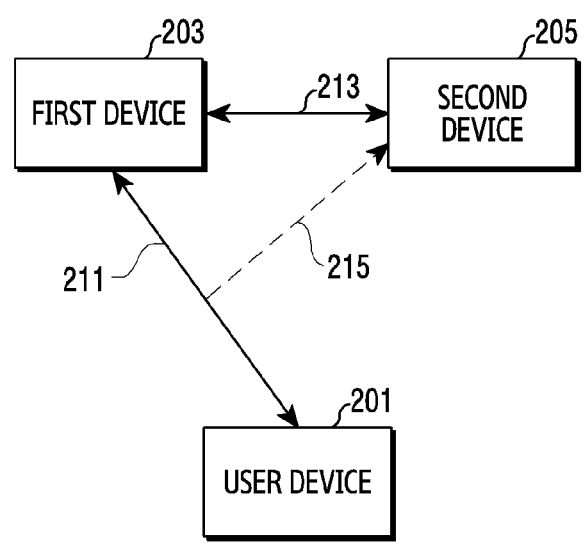
FIG. 2A illustrates a connection type between a user device and Bluetooth devices according to an embodiment.
Figure 2B:
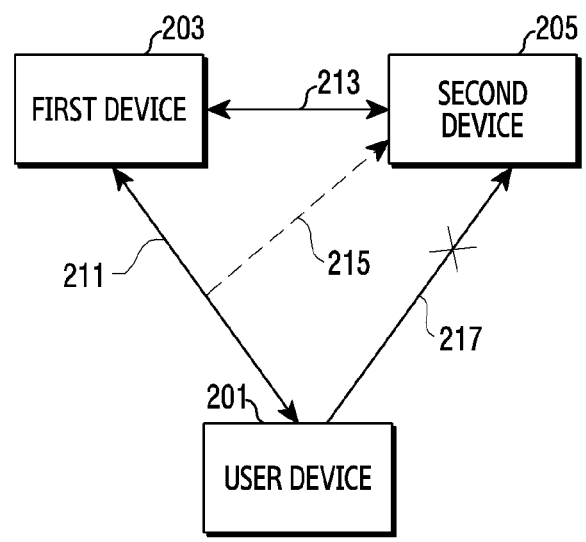
FIG. 2B illustrates another connection type between a user device and Bluetooth devices according to an embodiment.

FIG. 2A illustrates a connection type between a user device and Bluetooth devices according to an embodiment, and FIG. 2B illustrates another connection type between a user device and Bluetooth devices according to an embodiment.

Referring to FIGS. 2A and 2B, a user device 201 and devices 203 and 205 included in a Bluetooth topology (e.g., Bluetooth devices) may include elements that are at least partially identical or similar to the electronic device 101 shown in FIG. 1, and may perform at least partially identical or similar function. For example, the user device 201 and the devices 203 and 205 may perform a short range wireless communication according to a Bluetooth network defined by the Bluetooth special interest group (Bluetooth SIG). The Bluetooth network may include a Bluetooth legacy network or a BLE network, for example. According to an embodiment, the user device 201 and the devices 203 and 205 may perform a wireless communication via one of the Bluetooth legacy network or BLE network, or may perform a wireless communication via both networks.

The user device 201 may include a user terminal such as a smartphone, a tablet, a desktop computer, or a laptop computer, and the devices 203 and 205 may include accessory devices such as a earphone, a headset, a speaker, a mouse, a keyboard, or a display device. According to an embodiment, each of the devices 203 and 205 may recognize a counterpart device (e.g., first device 203 or second device 205) in advance, or store information (e.g., address information) of the counterpart device in advance. For example, when the first device 203 and the second device 205 are accessory devices (e.g., earphones) that constitute one set, the first device 203 and the second device 205 may recognize each other in advance or store address information of each other in advance.

According to an embodiment, the user device 201 may serve as a master device, and the first device 203 or the second device 205 may serve as a slave device. The number of the devices that serve as slave devices is not limited to the example shown in FIG. 2A or FIG. 2B. According to an embodiment, the role of the device may be determined in a procedure in which a communication link (e.g., first communication link 211 or second communication link 213) between the devices is established. According to another embodiment, one (e.g., first device 203) of the first device 203 and the second device 205 may serve as the master device, and the other device (e.g., the second device 205) may serve as a slave device.

The master device may control a physical channel. For example, the master device may transmit data (e.g., data packet), while the slave device may transmit data to the master device only after receiving data. For another example, channel resources (e.g., frequency hopping channel) for transmitting data may be determined based on clocks of the master device. In a Bluetooth legacy network, time resources (e.g., time slots) may be determined based on the clocks of the master device. In a BLE network, the master device and the slave device may transmit data for every designated interval, and respond after the designated time (e.g., the inter frame space T_IFS) when the data is received.

According to an embodiment, the user device 201 may transmit data including contents such as text, voice, image, or video to the devices 203 and 205. According to the type of the content included in the data, not only the user device 201 but also at least one device of the devices 203 and 205 may transmit data. For example, when music is played on the user device 201, data may be transmitted only to the user device 201, whereas when a call is performed on the user device 201, not only the user device 201 but also at least one of the devices 203 and 205 may transmit data including at least one content (e.g., voice data) to the user device 201. When only the user device 201 transmits data, the user device 201 may be referred to as a source device, and the devices 203 and 205 may be referred to as sink devices.

When the user device 201 forms (or creates or establishes) a plurality of communication links with a plurality of devices 203 and 205 for transmitting data, resource consumption, power consumption, and complexity of the user device 201 may increase. Thus, the user device 201 may establish a communication link (e.g., first communication link 211) with one (e.g., device 203) of the plurality of devices 203 and 205, and transmit data via the communication link. In this case, at least one other device (e.g., second device 205) may monitor 215 the communication link to obtain (or receive) data including contents. For example, the user device 201 may be referred to as a device under test (DUT), the first device 203 may be referred to as a primary equipment (PE), and the at least one other device, that is, the second device 205 may be referred to as a secondary equipment (SE). In addition, in the following description, a Bluetooth device directly connected to the user device 201 may mean the first device 203 that has established a communication link (e.g., first communication link 211) with the user device 201, and a Bluetooth device indirectly connected with the user device 201 may mean at least one other device (e.g., second device 205) that monitors the communication link.

In order for the second device 205 to monitor 215 the first communication link 211 established between the user device 201 and the first device 203 to obtain (or receive) data transmitted from the user device 201, the second device 205 may obtain connection information associated with the first communication link 211. For example, as shown in FIG. 2A, the first device 203 may form (or create or establish) a second communication link 213 with the second device 205, and transmit the connection information associated with the first communication link 211 to the second device 205 via the second communication link 213. For another example, as shown in FIG. 2B, the user device 201 may form (or create or establish) a third communication link 217 with the second device 205, and transmit the connection information associated with the first communication link 211 to the second device 205 via the third communication link 217. Here, after the user device 201 transmits the connection information associated with the first communication link 211 to the second device 205 via the third communication link 217, the user device 201 or the second device 205 may release (or terminate) the connection of the third communication link 217. Alternatively, the connection of the third communication link 217 may be maintained. The second device 205 that has received the connection information associated with the first communication link 211 may acquire data including contents from the user device 201 even without establishing a communication link with the user device 201.

For example, the connection information related to the first communication link 211 may include address information (e.g., Bluetooth address of a master device of the first communication link 211, Bluetooth address of the user device 201 and/or Bluetooth address of the first device 203), piconet clock information (e.g., clock native (CLKN) of a master device of the first communication link 211), logical transport (LT) address information (e.g., information assigned by a master device of the first communication link 211), used channel map information, link key information, service discovery protocol (SDP) information (e.g., service and/or profile information related to the first communication link 211), and/or supported feature information. In addition, the connection information related to the first communication link 211 may further include, for example, an extended inquiry response (EIR) packet. For example, the EIR packet may include resource control information and/or information on a manufacturer.

Although not shown, according to another embodiment, when the first device 203 and the second device 205 are devices that support the same user account or similar user accounts (e.g., family accounts), the first device 203 and the second device 205 may share the connection information related to the first communication link 211 through an external server (not shown) that is linked with the first device 203 or the second device 205 via the same or similar user account. In this case, the Bluetooth topology may further include an external server. For example, the first device 203 may transmit connection information associated with the first communication link 211 to an external server, and the external server may transmit the connection information associated with the first communication link 211 to the second device 205.

According to an embodiment, the first device 203 or the second device 205 may transmit a response message to the user device 201 to notify that the data transmitted by the user device 201 is normally received. In this specification, the normal reception of data may mean not only successfully receiving a signal including data, but also successfully processing (e.g., decoding or parsing) the data. The response message may include a positive acknowledgment (ACK) message indicating that the data has been received normally and a negative acknowledgment (NACK) message indicating that the data has not been received normally (or that the received data has not been processed normally). The response message may include, for example, 1 bit information. The user device 201 may transmit the next data if an ACK message is received after transmitting the data, and may retransmit the same data if a NACK message is received or a response message is not received within a designated time.

The second device 205 may transmit a response message to the first device 203 via the second communication link 213, but the first device 203 has to use some of the allocated resources to receive data from the user device 201, thus, resource waste may occur. When a portion of the resources of the first device 203 is used, the user device 201 may not receive a response message or a delay may occur, and thus performance degradation and power consumption of data transmission may increase. In addition, as the number of devices (e.g., second device 205) that do not create a communication link with the user device 201 increases, the time required for the first device 203 to identify whether to receive the data from another device (e.g., second device 205) may increase.

Thus, according to an embodiment, the second device 205 may transmit a response message to the user device 201 using the connection information associated with the first communication link 211 without passing through the first device 203, as the first device 203 transmits. For example, the second device 205 may create an access code and address information (e.g., LT address information) corresponding to the first communication link 211, based on the address information included in the connection information associated with the first communication link 211, and may transmit a response message including the created access code and address information to the user device 201.

Since the user device 201 establishes a single communication link (e.g., first communication link 211) with a single device (e.g., first device 203), it is possible to determine whether to retransmit the data, based on the kind of the response message received first, without considering all the response messages transmitted from the first device 203 and the second device 205.

According to an embodiment, the first device 203 and the second device 205 may determine a method for transmitting the response message via negotiation.

For example, the first device 203 may transmit a response message to the user device 201, based on the ACK message or NACK message from the second device 205. For example, the second device 205 may monitor 215 the data transmitted by the user device 201 via the first communication link 211, and transmit the reception result of the transmitted data to the first device 203 via the second communication link 213. For example, if the data is successfully received from the user device 201, the second device 205 may transmit an ACK message to the first device 203 via the second communication link 213, and if the data is not successfully received, transmit a NACK message to the first device 203 via the second communication link 213. At this time, when the first device 203 receives the NACK message from the second device 205, the first device 203 may transmit a response message including the NACK message to the user device 201 via the first communication link 211. In addition, when the data is not successfully received from the user device 201, the first device 203 may transmit a response message including the NACK message to the user device 201 via the first communication link 211. Alternatively, when the data is successfully received from the user device 201 and an ACK message for the data is received from the second device 205, the first device 203 may transmit a response message including the ACK message to the user device 201 via the first communication link 211.

For another example, the second device 205 may transmit a response message to the user device 201, based on the ACK message or the NACK message from the first device 203. For example, the first device 203 may transmit the reception result of the data transmitted via the first communication link 211 to the second device 205 via the second communication link 213. For example, if the data is successfully received from the user device 201, the first device 203 may transmit an ACK message to the second device 205 via the second communication link 213, and if the data is not successfully received, the first device 203 may transmit a NACK message to the second device 205 via the second communication link 213. For another example, if the data has not been successfully received, the first device 203 may not transmit the ACK message to the second device 205. If a NACK message has been received or an ACK message has not been received from the first device 203, the second device 205 may transmit a response message including the NACK message to the user device 201, based on the connection information associated with the first communication link 211 as if the first device 203 transmits. In addition, if the data has not been successfully received from the user device 201, the second device 205 may transmit a response message including a NACK message to the user device 201, based on the connection information associated with the first communication link 211 as if the first device 203 transmits. Alternatively, if the data has been successfully received from the user device 201 and an ACK message for the data has been received from the first device 203, the second device 205 may transmit a response message including an ACK message to the user device 201, based on the connection information associated with the first communication link 211 as if the first device 203 transmits.

For yet another example, the first device 203 and the second device 205 may transmit an ACK message and a NACK message at different times. For example, the first device 203 and the second device 205 may transmit an ACK message and a NACK message for data received from the user device 201 at different times within one time interval (e.g., slot). The first device 203 and the second device 205 may transmit an ACK message and a NACK message to the user device 201 using different sub slots among a plurality of sub slots constituting one slot. The first device 203 and the second device 205 may transmit an ACK message and a NACK message at a time not overlapping each other within one time period (e.g., time period configured for data transmission).

For still another example, the second device 205 may transmit a NACK message using a time margin period (e.g., Rx cycle) configured around slots. For example, if the data has been successfully received from the user device 201, the second device 205 may not transmit an ACK message and a NACK message within the time margin period. In this case, the first device 203 may transmit an ACK message to the user device 201 via the first communication link 211 after the elapse of time margin interval. For another example, if the second device 205 fails to receive data from the user device 201, the second device 205 may transmit a NACK message to the user device 201 within a time margin period. Thus, the second device 205 may transmit a NACK message to the user device 201 prior to the first device 203 only if the data has not been successfully received from the user device 201.

For another example, the types of response messages transmitted by the first device 203 and the second device 205 may be different. For example, the first device 203 may send an ACK message to the second device 205 upon successfully receiving data from the user device 201. In this case, when the second device 205 receives the ACK message from the first device 203 and successfully receives data from the user device 201, the second device 205 may transmit an ACK message to the user device 201, based on connection information associated with the first communication link 211 as if the first device 203 transmits. For another example, if the second device 205 receives the ACK message from the first device 203 but fails to receive data from the user device 201, the second device 205 may not transmit any response message. For another example, if the first device 203 fails to receive data from the user device 201, the first device 203 may transmit a NACK message to the user device 201 via the first communication link 211. In this case, the second device 205 may not transmit any response message to the user device 201. Accordingly, the user device 201 may receive only an ACK message from the second device 205 and only a NACK message from the first device 203. The user device 201 may recognize that the case of no response corresponds to a NACK message.

As another example, the first device 203 and the second device 205 may alternately transmit an ACK message and a NACK message. For example, the ACK message and the NACK message for the first data from the user device 201 may be transmitted by the first device 203, and the ACK message and the NACK message for subsequent second data may be transmitted by the second device 205. For example, a device (e.g., first device 203 or second device 205) configured to transmit ACK and NACK messages may collect an ACK message or a NACK message from other devices (e.g., second device 205 or first device 203) to transmit the ACK message or the NACK message to the user device 201.

According to an embodiment, if the first device 203 and/or the second device 205 fails to receive data from the user device, the data may be retransmitted. For example, the user device 201 may retransmit data in response to receiving the NACK message or not receiving the ACK message. For another example, the first device 203 or the second device 205 may perform retransmission of data on behalf of the user device 201. For example, if the first device 203 receives data from the user device 201 but the second device 205 fails to receive data, the first device 203 may retransmit data to the second device 205 via the second communication link 213. For another example, if the second device 205 receives data from the user device 201 but the first device 203 fails to receive data, the second device 205 may retransmit data to the first device 203 via the second communication link 213.

Since not only the first device 203 but also the second device 205 transmits a response message to the user device 201 using the above-described methods, the balance of power consumption of the first device 203 and the second device 205 may be improved while reducing the complexity for creating the communication link of the user device 201.

As described above, according to various embodiments, an electronic device (e.g., first device 203) may include a wireless communication circuit, and a processor, wherein the processor is configured to establish a first communication link (e.g., first communication link 211) with a first external electronic device (e.g., user device 201) using the wireless communication circuit, to establish a second communication link (e.g., second communication link 213) with a second external electronic device (e.g., second device 205) using the wireless communication circuit, to transmit connection information associated with the first communication link to the second external electronic device via the second communication link, to determine whether configuration information related to an operation of the first communication link needs to be changed, to identify first operation information of the electronic device for the first communication link upon determination that the configuration information needs to be changed, to request second operation information of the second external electronic device for the first communication link from the second external electronic device via the second communication link, to determine whether to change the configuration information, based on the first operation information and the second operation information in response to the reception of the second operation information, to determine a change value of the configuration information, based on the first operation information and the second operation information, on basis of determining of the change of the configuration information, and to transmit the determined change value of the configuration information to the first external electronic device via the first communication link.

According to various embodiments, the configuration information may include at least one of adaptive frequency hopping (AFH), power control, channel quality driven data rate change (CQDDR), link supervision timeout (LSTO), quality of service (QoS), max slot, or packet type table (PTT).

According to various embodiments, the processor may be configured to determine whether the configuration information needs to be changed, based on at least one of the status change of the electronic device or the first external electronic device, the status of the first communication link, the occurrence of a communication failure caused by obstacles.

According to various embodiments, when changing the configuration information, the processor may be configured not to transmit the determined change value of the configuration information to the first external electronic device if it is determined that the data transmitted from the first external electronic device via the first communication link cannot be received, in a process in which the second external electronic device monitors the first communication link on basis of the connection information.

According to various embodiments, if a value indicated by the second operation information is out of the range indicated by the determined change value of the configuration information, the processor may be configured to determine that the second external electronic device cannot receive the data transmitted from the first external electronic device via the first communication link.

According to various embodiments, if each of the first operation information and the second operation information includes a numerical value, the processor may be configured to determine an average value of a first numerical value represented by the first operation information and a second numerical value represented by the second operation information, a smaller value or a larger value from the first numerical value and the second numerical value as the change value of the configuration information, and if each of the first operation information and the second operation information includes a range value, to determine a third range value corresponding to a common part of a first range value represented by the first operation information and a second range value represented by the second operation information as the change value of the configuration information.

As described above, according to various embodiments, an electronic device (e.g., second electronic device 205) may include a wireless communication circuit, and a processor, wherein the processor may be configured to establish a first communication link (e.g., second communication link 213) with a first external electronic device (e.g., first device 203) using the wireless communication circuit, to receive connection information associated with a second communication link (e.g., first communication link 211) established between the first external electronic device and a second external electronic device (e.g., user device 201) via the first communication link, to monitor the second communication link, based on the received connection information, to receive a request for sharing a first operation information of the electronic device for the second communication link via the first communication link, and to transmit the first operation information to the first external electronic device via the first communication link.

According to various embodiments, the connection information may include at least one of address information of the electronic device, address information of the first external electronic device, piconet clock information, logical transport address information, used channel map information, link key information, service discovery protocol (SDP) information, supported feature information, or extended inquiry response (EIR) packet, wherein the processor may be configured to calculate a channel access code and a hopping frequency of the second communication link, based on the connection information, and to monitor the second communication link, based on the channel access code and the hopping frequency.

According to various embodiments, the processor may be configured to determine whether the configuration information related to an operation of the second communication link needs to be changed, to identify the first operation information, upon determination that the configuration information needs to be changed, to request second operation information of the first external electronic device for the second communication link from the first external electronic device via the first communication link, to determine whether to change the configuration information, based on the first operation information and the second operation information, in response to reception of the second operation information, to determine a change value of the configuration information, based on the first operation information and the second operation information, on basis of determination to change the configuration information, and to transmit the determined change value of the configuration information to the second external electronic device, based on the connection information.

As described above, according to various embodiments, an electronic device (e.g., user device 201) may include a wireless communication circuit, and a processor, wherein the processor may be configured to establish a first communication link (e.g., first communication link 211) with a first external electronic device (e.g., first device 203) using the wireless communication circuit, to establish a second communication link (e.g., third communication link 217) with a second external electronic device (e.g., second device 205) using the wireless communication circuit, to transmit connection information related to the first communication link to the second external electronic device via the second communication link, to determine whether the configuration information related to an operation of the first communication link needs to be changed, to determine a change value of the configuration information, upon determining to change the configuration information, and to transmit the determined change value of the configuration information to the first external electronic device via the first communication link.

According to various embodiments, the processor may be configured to release a connection to the second communication link, under the determination that the connection information has been transmitted via the second communication link.

In FIGS. 3A to 5B to be described later, it will be described in detail how the devices involved in a communication link to synchronize the resources (hereinafter, referred to as link operation elements) used to operate the communication link between Bluetooth devices (e.g., user device 201, first device 203, and second device 205) to ensure a stable link quality. In particular, a method for requesting a status change of the link operation element by a first device 203 directly connected to the user device 201 will be described in FIGS. 3A and 3B, a method for requesting a status change of the link operation element by a second device 205 indirectly connected (monitoring the communication link) with the user device 201 will be described in FIGS. 4A and 4B, and a method for requesting a status change of the link operation element by the user device 201 will be described in FIGS. 5A and 5B. In FIGS. 3A to 5B, as operations (e.g., operation 301 to operation 304, operation 401 to operation 404, or operation 501 to operation 504) for establishing communication links between the devices, various methods for establishing the communication links described in FIGS. 2A and 2B may be applied.

Figure 3A:
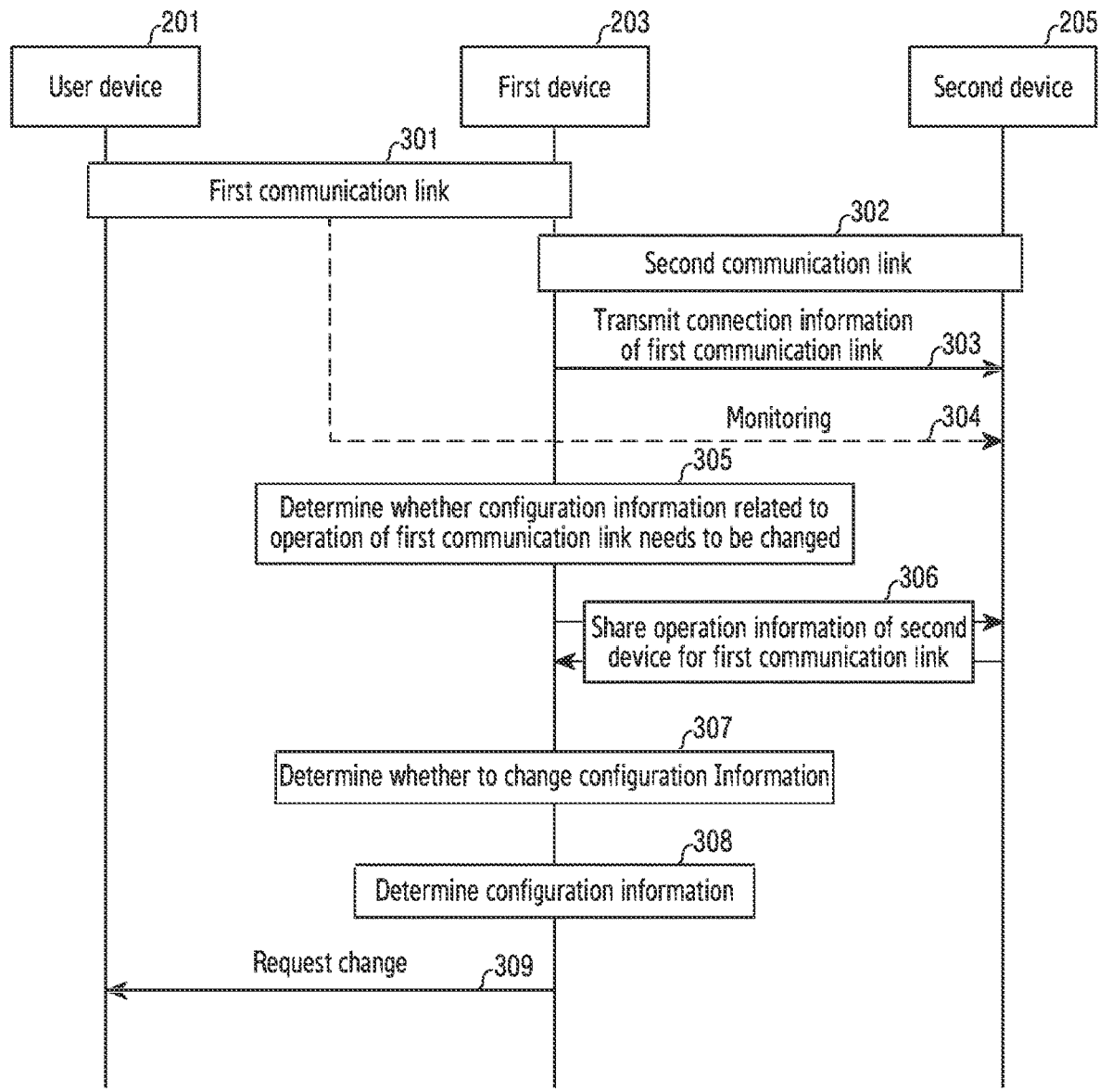
FIG. 3A illustrates a method for requesting a state change of a link operation element by a Bluetooth device directly connected to a user device according to an embodiment.
Figure 3B:
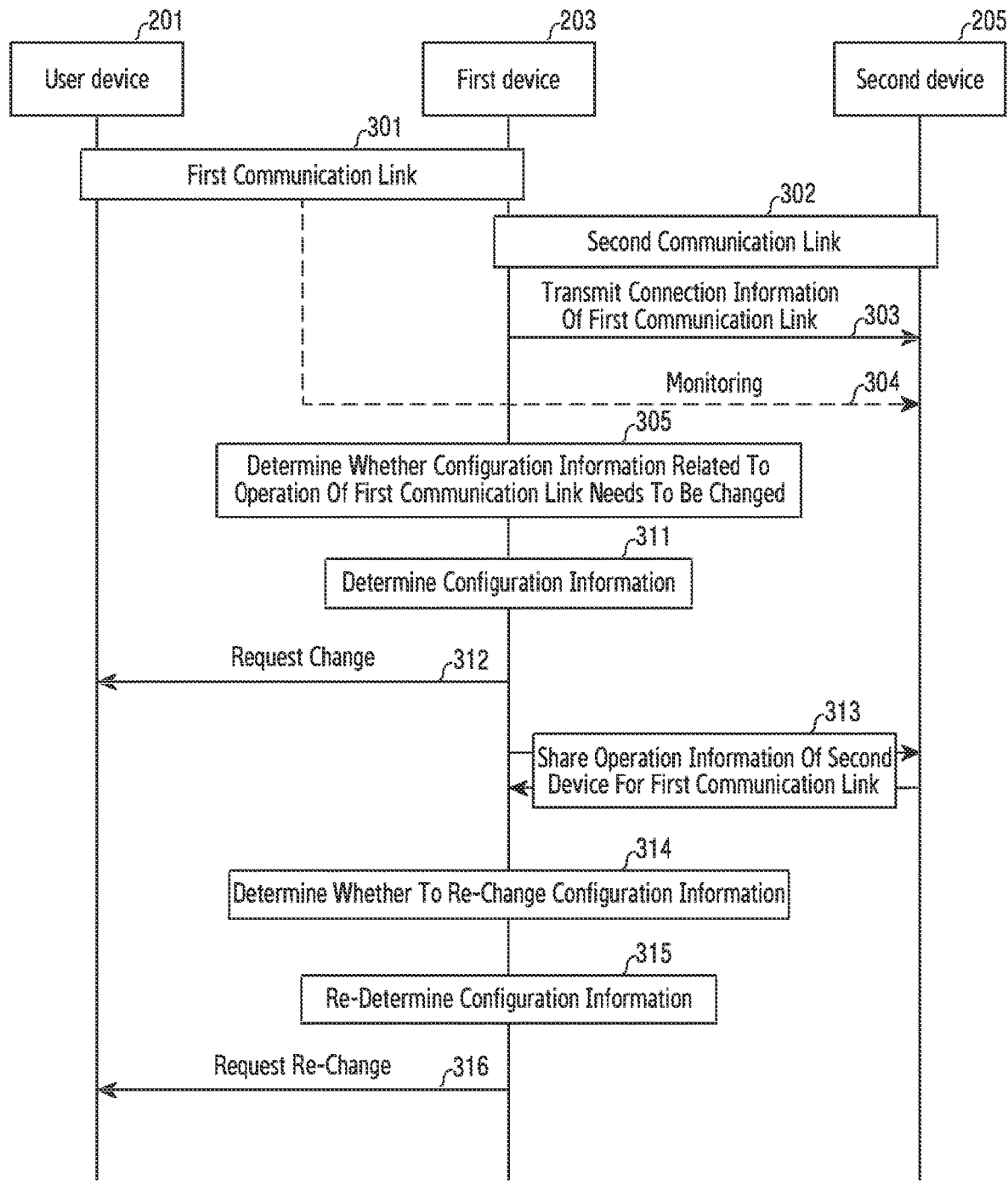
FIG. 3B illustrates another method for requesting a state change of a link operation element by a Bluetooth device directly connected to a user device according to an embodiment.

FIG. 3A illustrates a method for requesting a status change of a link operation element by a Bluetooth device directly connected to a user device, according to an embodiment of the disclosure, and FIG. 3B illustrates another method for requesting a status change of a link operation element by a Bluetooth device directly connected to a user device, according to an embodiment of the disclosure.

Referring to FIGS. 3A and 3B, in operation 301, a user device 201 and a first device 203 may form (or create or establish) a first communication link (e.g., first communication link 211) through a wireless communication circuit (e.g., Bluetooth communication circuit). In order to establish the first communication link 211, the user device 201 may recognize the first device 203 using the wireless communication. For example, the first device 203 may generate an advertising signal in a multicast or broadcast manner around the first device 203, and the user device 201 may recognize the first device 203 when the user device 201 receives the advertising signal. For example, the advertising signal may be a signal for connecting an unspecified peripheral electronic device or for transmitting information associated with an account (e.g., pairing) through wireless communication. The advertising signal may include, for example, at least one of identification information (device identification information) of the first device 203, account information of a user (user account information), information (current pairing information) on whether it is currently paired with another device (e.g., second device 205), a list (pairing list) of previously paired devices, information on device that can be paired simultaneously (simultaneous pairing information), a transmission power (Tx power), or information on a detection area or a remaining battery power (battery status information).

According to an embodiment, the first device 203 may generate the advertising signal according to a designated condition. For example, the first device 203 may generate the advertising signal at a time when a power is supplied to the first device 203, or generate the advertising signal at a designated time period, or generate the advertising signal when a user input occurs. For another example, the first device 203 may generate the advertising signal when a case is opened or the first device 203 is separated from the case while being stored in a separate case.

According to an embodiment, if the user device 201 receives the advertising signal, the user device 201 may output a user interface related to a communication connection to a display (e.g., display device 160). For example, the user device 201 may output a user interface to the display according to various conditions, based on information included in the advertising signal. The user interface may, for example, include an image corresponding to the first device 203. In addition, the user interface may include device recognition information. The device recognition information may include information about a result of recognizing the first device 203 by the user device 201. For example, the device recognition information may indicate whether the user device 201 has been previously paired with the first device 203 and may be displayed based on a user account.

According to an embodiment, the user device 201 may perform a connecting operation to the recognized first device 203, based on Bluetooth legacy or BLE protocol. For example, the user device 201 may recognize the first device 203, based on the Bluetooth legacy and/or BLE protocol, and may perform the connecting operation to the first device 203, based on the Bluetooth legacy or BLE protocol. In addition, when the connection operation to the first device 203 is completed (first communication link is established), the user device 201 may transmit designated data (e.g., sound source data or voice data) via the first communication link.

In operation 302, the first device 203 and the second device 205 may form (or create or establish) a second communication link (e.g., second communication link 213) via a wireless communication circuit (e.g., Bluetooth communication circuit). A method for establishing the second communication link may be identical or similar to the method for establishing the first communication link. In addition, the second communication link may be established first, before the first communication link is established. For example, the first device 203 may establish the first communication link with the user device 201 after establishing the second communication link with the second device 205.

According to an embodiment, the first device 203 and the second device 205 may be stored in separate cases. For example, the first device 203 and the second device 205 may be seated in a case (or cradle) for charging and storage. The first device 203 (or second device 205) may connect a wireless communication with the user device 201 or the second device 205 (or first device 203) when the case is opened or the first device 203 (or second device 205) is detached from the case. In some embodiments, when a button provided on one surface of the case is pressed, the first device 203 (or second device 205) may connect a wireless communication with the user device 201 or the second device (or first device 203).

For example, when the case is opened, the first device 203 may generate the advertising signal in a multicast method or a broadcast method, when the user device 201 receives the advertising signal, the user device 201 may recognize the first device 203, and may perform a connection operation (form first communication link 211) with the first device 203, based on Bluetooth legacy or BLE protocol. In addition, the second device 205 may generate the advertising signal in a multicast method or a broadcast method, when the first device 203 receives the advertising signal, the first device 203 may recognize the second device 205 and perform a connection operation (form second communication link 211), based on the Bluetooth legacy or BLE protocol.

For another example, when the case is opened, the first device 203 may preferentially connect the wireless communication with the second device 205 before connecting the wireless communication with the user device 201. For example, the first device 203 may establish the second communication link 213 with the second device 205 before establishing the first communication link 211 with the user device 201.

For yet another example, wireless communication between devices may not be connected when the case is opened, and the wireless communication may be connected when the device is separated from the case. For example, when the case is opened and the first device 203 is detached from the case, the first device 203 may connect wireless communication with the user device 201 (establish a first communication link 211). At this time, if the second device 205 is not separated from the case, the first device 203 may not connect wireless communication with the second device 205 (establish a second communication link). Similarly, when the case is opened and the second device 205 is detached from the case, the second device 205 may connect wireless communication with the user device 201 (establish a third communication link 217). At this time, if the first device 203 is not separated from the case, the second device 205 may not connect wireless communication with the first device 203 (establish the second communication link 213).

According to an embodiment, although the first device 203 has a link ownership for the communication link while establishing a communication link directly with the user device 201 and the second device 205 may monitor the communication link, the role may be changed depending on the situation. For example, the second device 205 may have a link ownership for the communication link. In some embodiments, the second device 205 may establish a communication link directly with the user device 201, and the first device 203 may monitor the communication link.

For example, if the second device 205 is first detached from the case and the first device 203 is later detached from the case, the second device 205 may preferentially connect wireless communication with the user device 201 and the first device 203 may monitor a communication link between the user device 201 and the second device 205. For another example, with the first device 203 establishing a communication link with the user device 201 and the second device 205 monitoring the communication link, if the first device 203 is difficult to maintain the communication link (if the power of the first device 203 is turned off or if the amount of battery of the first device 203 becomes a low battery), the second device 205 may take over the link ownership for the communication link.

In operation 303, the first device 203 may transmit connection information related to the first communication link to the second device 205 via the second communication link. For example, the connection information related to the first communication link may include address information (e.g., Bluetooth address of a master device of the first communication link 211, Bluetooth address of the user device 201 and/or Bluetooth address of the first device 203), piconet clock information (e.g., CLKN of a master device of the first communication link), logical transport (LT) address information (e.g., information allocated by a master device of the first communication link), used channel map information, link key information, SDP information (e.g., service and/or profile information related to the first communication link), and/or supported feature information. In addition, the connection information related to the first communication link may further include, for example, an EIR packet. For example, the EIR packet may include resource control information of the first communication link and/or information on a manufacturer.

In operation 304, the second device 205 may monitor (e.g., monitoring 215) the first communication link, based on connection information related to the first communication link. For example, the second device 205 may calculate a channel access code and a hopping frequency of the first communication link, based on the connection information related to the first communication link, and may monitor the first communication link, based on the channel access code and hopping frequency. In addition, the second device 205 may prepare to provide the same service as the service provided by the user device 201 to the first device 203, using at least one of the SDP information, supported feature information, or information on a manufacturer of the connection information associated with the first communication link.

In the above-described operations 301 to 304, as in FIG. 2A, although a case in which the first device 203 establishes the second communication link with the second device 205, and transmits the connection information related to the first communication link to the second device via the second communication link has been described, but the disclosure is not limited thereto. According to various embodiments, as in FIG. 2B, the corresponding operations may be replaced with operations corresponding to the case where the user device 201 establishes a third communication link (e.g., third communication link 217) with the second device 205 and transmits connection information related to the first communication link to the second device 205 via the third communication link. According to an embodiment, the second device 205 may receive connection information related to the first communication link through an external server.

In a state where the second device 205 monitors the first communication link, as in operation 305, the first device 203 may determine whether configuration information related to operations of the first communication link needs to be changed. For example, the configuration information may be information indicating a configuration status of resources used to operate the first communication link. That is, the configuration information may be information indicating a configuration status of a link operation element associated with the first communication link. The link operation element may include, for example, at least one of AFH, power control, CQDDR, LSTO, QoS, max slot, or packet type table (PTT).

According to an embodiment, the first device 203 may determine the occurrence of a communication failure due to status change (e.g., location change) of the user device 201 and/or the first device 203, a status (network state) of the first communication link, or communication failure due to an obstacle, and determine whether the configuration information needs to be changed.

If it is determined that the configuration information needs to be changed, the first device 203 may request the user device 201 to change the configuration information after identifying the operation information of the second device 205 for the first communication link, or identify the operation information of the second device 205 for the first communication link after requesting the user device 201 to change the configuration information, and if it is determined that the rechange of the configuration information is necessary, request re-change the configuration information from the user device 201. The operations of FIG. 3A correspond to the former case in which the operation information of the first device 203 and the operation information of the second device 205 are collected to request a change of the configuration information, and the operations of FIG. 3B correspond to the latter case of requesting the change of the configuration information, based on the operation information of the second device 205, after requesting the change of the configuration information, based on the operation information of the first device 203.

Referring to FIG. 3A, if it is determined that the configuration information needs to be changed, in operation 306, the first device 203 may share the operation information of the second device 205 for the first communication link with the second device 205. For example, the first device 203 may request operation information of the second device 205 for the first communication link from the second device 205 via the second communication link, and the second device 205 may transmit the operation information of the second device 205 for the first communication link to the first device 203 via the second communication link. For example, the operation information of the second device 205 may be information representing a configurable status of a resource used by the second device 205 monitoring the first communication link to obtain (or receive) data via the first communication link. That is, the operation information of the second device 205 may be information representing a status of a link operation element associated with the first communication link necessary (or configurable) for the second device 205 to monitor the first communication link.

According to an embodiment, the second device 205 may transfer the operating information of the second device 205 for the first communication link to the first device 203 via the second communication link at a designated time period. For example, after the second device 205 establishes the second communication link with the first device 203, the second device 205 may transmit the operation information of the second device 205 to the first device 203 through the second communication link at a designated time period. In some embodiments, after the second device 205 transmits the operation information of the second device 205 to the first device 203, if the status of the second device 205 changes (e.g., change location) or the operation information of the second device 205 for the first communication link is changed due to an abnormal phenomenon, the second device 205 may transfer the changed operation information of the second device 205 to the first device 203.

In operation 307, the first device 203 may determine whether to change the configuration information. According to an embodiment, the first device 203 may determine whether to change the configuration information, based on the operation information (first operational information) of the first device 203 for the first communication link and the operation information (second operation information) of the second device 205 for the first communication link. For example, the operation information of the first device 203 may be information representing a configurable status of a resource used by the first device 203 to obtain (or receive) data via the first communication link. That is, the operation information of the first device 203 may be information representing the status of a link operation element related to the first communication link required (or configurable) for the first device 203 to establish and maintain the first communication link.

A process of determining whether to change the configuration information will be described in more detail.

According to an embodiment, a Bluetooth device (e.g., user device 201, first device 203, and second device 205) may have a golden receive power range (GRPR), and typically have a GRPR of a range about 20 dBm, such as from −40 dBm to −60 dBm. If the value obtained by processing the strength (RSSI) of the signal received from the user device 201 is higher or lower than a range indicated by the GRPR, the first device 203 may request the user device 201 power control so that the processed RSSI value falls within the range. In this case, the first device 203 may determine whether to request power control in consideration of the processed RSSI value of the second device 205. That is, the first device 203 may determine whether to change the configuration information so that a situation in which the first device 203 or the second device 205 cannot not receive a signal does not occur when power control is requested, in consideration of the value obtained by processing the strength of the signal received by the first device 203 from the user device 201 and the value obtained by processing the strength of the signal received by the second device 205 from the user device 201. For example, if the GRPR is configured to from −40 dBm to −60 dBm, the processed RSSI value of the first device 203 is −35 dBm, and the processed RSSI value of the second device 205 is −60 dBm, when the first device 203 requests the user device 201 to decrease power control, since the strength of the received signal of the second device 205 is lower than the range indicated by the GRPR and it may be difficult for the second device 205 to receive the signal, the first device 203 may determine not to request power control.

In an embodiment, the Bluetooth device (e.g., user device 201, first device 203, and second device 205) may change the channel being used according to the surrounding channel environment and the position of the obstacle. In the case of Bluetooth devices supporting AFH, the status may be checked for each received channel, and a channel having a poor status may be excluded in the next channel hopping determination. In addition, when the status of the excluded channel is improved, the corresponding channel may be included in the next channel hopping determination. For an example, if it is determined that the channel map being used needs to be changed, according to the change in the surrounding wireless environment, the first device 203 may request the user device 201 to change the AFH when the first device 203 acts a master role, and the first device 203 may request the user device 201 channel classification when the first device 203 acts as a slave role. At this time, the first device 203 may request and receive the channel status of the second device 205 for the first communication link from the second device 205, and may determine the changeable channel information, based on the channel status of the first device 203 and the channel status of the second device 205 to request AFH or channel classification to the user device 201.

According to an embodiment, the Bluetooth device (e.g., user device 201, first device 203, and second device 205) may selectively use various packet types using the CQDDR in communication. For example, the Bluetooth packet type may be determined as a variety of packet types by combining a modulation method element (e.g., data rate) and a size element (e.g., data size). For example, the Bluetooth device may determine or change the packet type, based on various factors such as quality measurement of the receiver, that is, bit error rate, packet error rate, or RSSI. For example, the first device 203 may request to change the data rate and data size using CQDDR, based on a reception quality such as bit error rate, packet error rate, or RSSI. At this time, the first device 203 may request and receive the reception quality status of the second device 205 from the second device 205, and determine the data rate and data size, based on the reception quality status of the first device 203 and the reception quality status of the second device 205 to request the user device 201 to change the CQDDR.

According to an embodiment, the Bluetooth device (e.g., user device 201, first device 203, and second device 205) may use an LSTO value in order to release the connection of communication link, in situations where it is difficult to communicate far away from the connected counterpart device or to maintain the communication link due to the surrounding environment. For example, when two devices are connected, the device acting as the master may determine the LSTO value, and if no traffic succeeds for the period, based on the LSTO value, it may be determined that the connection has been released. For an example, when the first device 203 performs a master role, the first device 203 may request the user device 201 to change the LSTO. In this case, the first device 203 may request the LSTO value longer than the general LSTO value in consideration of the situation in which the second device 205 is monitoring the first communication link. Alternatively, the first device 203 may request a short LSTO value in consideration of fast disconnection and reconnection.

According to an embodiment, a Bluetooth device (e.g., user device 201, first device 203, and second device 205) may have various types of communication links such as an active mode or a sniff mode when Bluetooth communication is connected to an external electronic device. In particular, in the active mode, in a general state after communication connection, the master device may have a duty to deliver a polling packet once for each Tpoll (e.g., 40 slot) configured as a default value of QoS. For example, when a specific operation occurs, the first device 203 may request the user device 201 to change the QoS. For example, the first device 203 may request the user device 201 to change the QoS to a Tpoll value shorter than the default value for more efficient operation of the communication link in connection with a music playback service. At this time, the first device 203 may inquire the second device 205 of whether the second device 205 performs another operation or if the Tpoll value may be shortened. The first device 203 may receive a response to the query from the second device 205 and request the user device 201 to change the QoS with reference to the response.

According to an embodiment, the Bluetooth device (e.g., user device 201, first device 203, and second device 205) may limit the number of consecutive slots (hereinafter, referred to as max slots) when communicating with an external electronic device. The Bluetooth device may limit the number of the max slots of all user asynchronous logical link (ACL-U) data in addition to the packet whose data size is determined, such as a call. For example, if the Bluetooth device supports an audio sink, the number of the max slots may be limited to 5 slots to continuously deliver high quality media data, and if data transmission is to be secured in real time, such as a call, the number of the max slots of ACL-U data may be limited to 1 slot to ensure sound quality of the call. For example, the first device 203 may request the user device 201 to change the max slot. In this case, the first device 203 may request and receive the number of the max slots available to the second device 205 from the second device 205, and determine the number of the max slots to be changed, based on the number of the max slots available to the first device 203 and the number of the max slots available to the second device 205 to request the user device 201 to change the number of the max slot.

According to an embodiment, the Bluetooth device (e.g., user device 201, first device 203, and second device 205) may change whether to use an enhanced data rate (EDR) when communicating with an external electronic device. When two electronic devices are connected for the first time, the basic rate (BR) may be used, and when the use of the EDR is required, the PTT may be requested so that the EDR may be used. For example, if it is determined that a large amount of data needs to be transmitted, the first device 203 may request PTT from the user device 201 so that the EDR may be used. In this case, the first device 203 may request confirmation of whether the PTT may be changed to the second device 205, and if the second device 205 can change the PTT, the first device 203 may request the PTT to the user device 201.

If it is determined that the change of the configuration information is impossible, the first device 203 may omit the following operations (e.g., operation 308 and operation 309) so that the configuration information is maintained. If it is determined that the change of the configuration information is possible, in operation 308, the first device 203 may determine the configuration information. The first device 203 may determine the configuration information, based on an operation information (first operation information) of the first device 203 and an operation information (second operation information) of the second device 205. For example, if each of the first operation information and the second operation information includes a numerical value, the first device 203 may determine an average value of the first operation information and the second operation information as the configuration information. Alternatively, the first device 203 may determine a smaller value or a larger value from the first operation information and the second operation information as the configuration information. As another example, if each of the first operation information and the second operation information includes a range value, the first device 203 may determine a common partial value of the range value of the first operation information and the range value of the second operation information as the configuration information.

According to an embodiment, the first device 203 may use an average value of a processed RSSI value of the first device 203 and a processed RSSI value of the second device 205, when determining the configuration information related to power control. Alternatively, the first device 203 may apply different weights to the processed RSSI value of the first device 203 and the processed RSSI value of the second device 205. For example, the first device 203 may apply a greater weight to the processed RSSI value of the first device 203 than the processed RSSI value of the second device 205.

According to an embodiment, the first device 203 may use a common channel range between the channel range indicated by the channel information of the first device 203 and the channel range indicated by the channel information of the second device 205, when determining the configuration information related to channel map change.

According to an embodiment, the first device 203 may determine a smaller value of the data rate and data size available to the first device 203 and the data rate and data size available to the second device 205 as the configuration information, when determining the configuration information related to CQDDR change. For example, if the data rate/data size determined according to the reception quality result of the first device 203 is 3M/5 Slot, and the data rate/data size determined according to the reception quality result of the second device 205 is 2M/3 Slot, the first device 203 may request the user device 201 to use 2M/3 Slot.

According to an embodiment, the first device 203 may determine a smaller value between the max slot number available to the first device 203 and the max slot number available to the second device 205 as the configuration information, when determining the configuration information related to max slot change. For example, if the number of max slots available to the first device 203 is 5 slots and the number of max slot available to the second device 205 is 3 slots, the first device 203 may request the user device 201 to change the number of max slot to 3 slots.

In operation 309, the first device 203 may request the user device 201 to change the configuration information via the first communication link. According to an embodiment, the first device 203 may transfer the determined configuration information to the user device 201. The user device 201 that is requested to change the configuration information may change the preconfigured configuration information for the first communication link, based on the configuration information received from the first device 203. For example, the user device 201 may change the configuration state of the link operation element of the first communication link.

Referring to FIG. 3B, if it is determined that the configuration information needs to be changed, the first device 203 may determine the configuration information in operation 311. The first device 203 may determine the configuration information, based on the operation information (first operation information) of the first device 203.

In operation 312, the first device 203 may request the user device 201 to change the configuration information via the first communication link. According to an embodiment, the first device 203 may transfer the determined configuration information to the user device 201.

In operation 313, the first device 203 may share the operation information of the second device 205 for the first communication link. For example, the first device 203 may request the operation information of the second device 205 for the first communication link from the second device 205, and transmit the operation information of the second device 205 for the first communication link to the first device 203 via the second communication link.

In operation 314, the first device 203 may determine whether to rechange the configuration information. According to an embodiment, the first device 203 may determine whether to rechange the configuration information, based on the operation information (first operation information) of the first device 203 for the first communication link and the operation information (second operation information) of the second device 205 for the first communication link. Operation 314 of FIG. 3B may be identical or similar to operation 307 of FIG. 3A.

In operation 315, the first device 203 may re-determine the configuration information. The first device 203 may re-determine the configuration information, based on the operation information (first operation information) of the first device 203 and the operation information (second operation information) of the second device 205. Operation 315 of FIG. 3B may be identical or similar to operation 308 of FIG. 3A.

If it is determined that the re-change of the configuration information is impossible (or unnecessary), the first device 203 may omit the following operations (e.g., operation 315 and operation 316) so that the configuration information is maintained. If it is determined that the re-change of the configuration information is possible (or necessary), in operation 316, the first device 203 may request the user device 201 to rechange the configuration information via the first communication link. According to an embodiment, the first device 203 may transfer the re-determined configuration information to the user device 201. The user device 201 that is requested to change the configuration information may change the preconfigured configuration information for the first communication link, based on the re-determined configuration information received from the first device 203. For example, the user device 201 may rechange the configuration state of the link operation element of the first communication link.

Figure 4A:
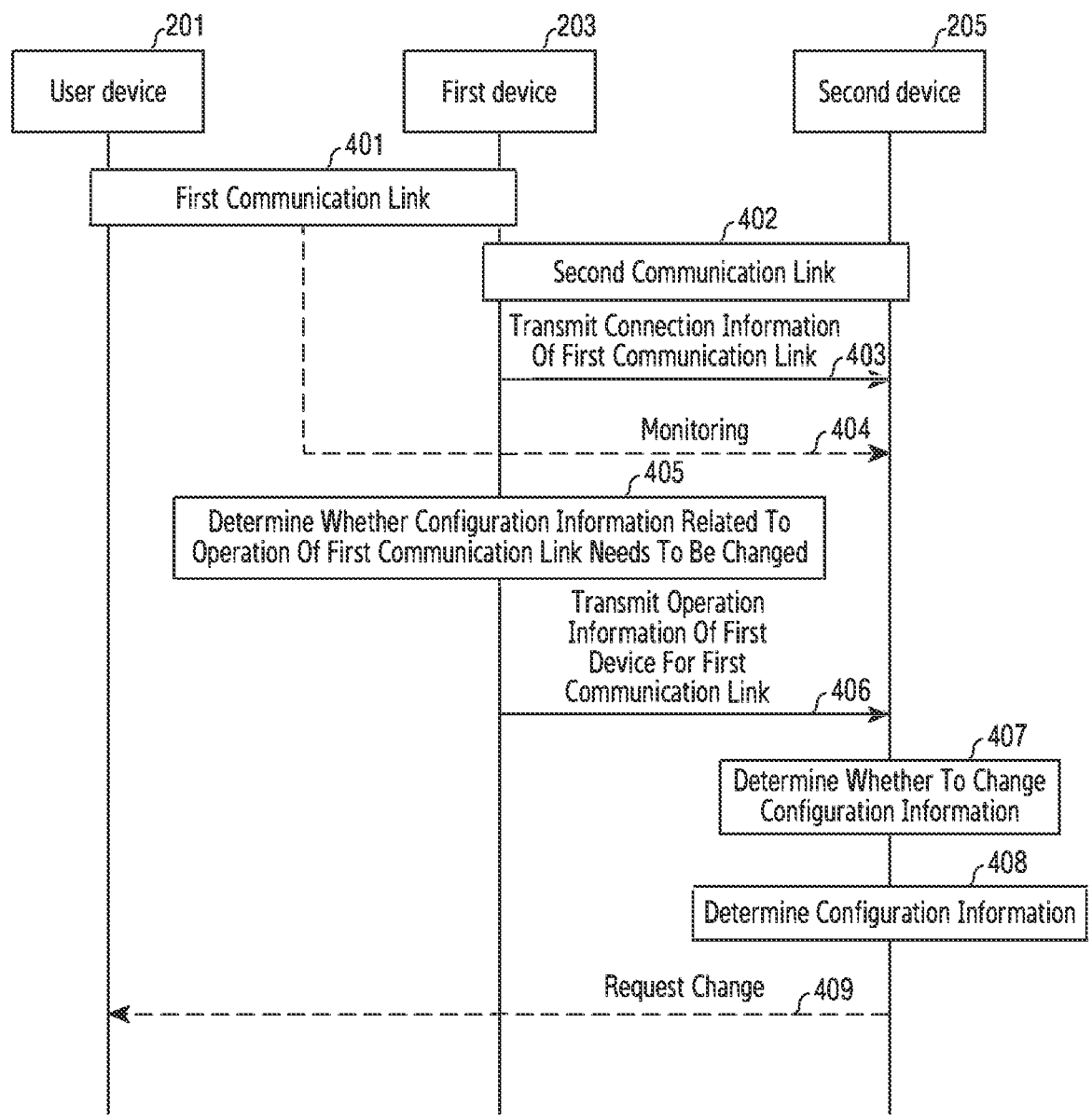
FIG. 4A illustrates a method for requesting a state change of a link operation element by a Bluetooth device indirectly connected to a user device according to an embodiment.
Figure 4B:
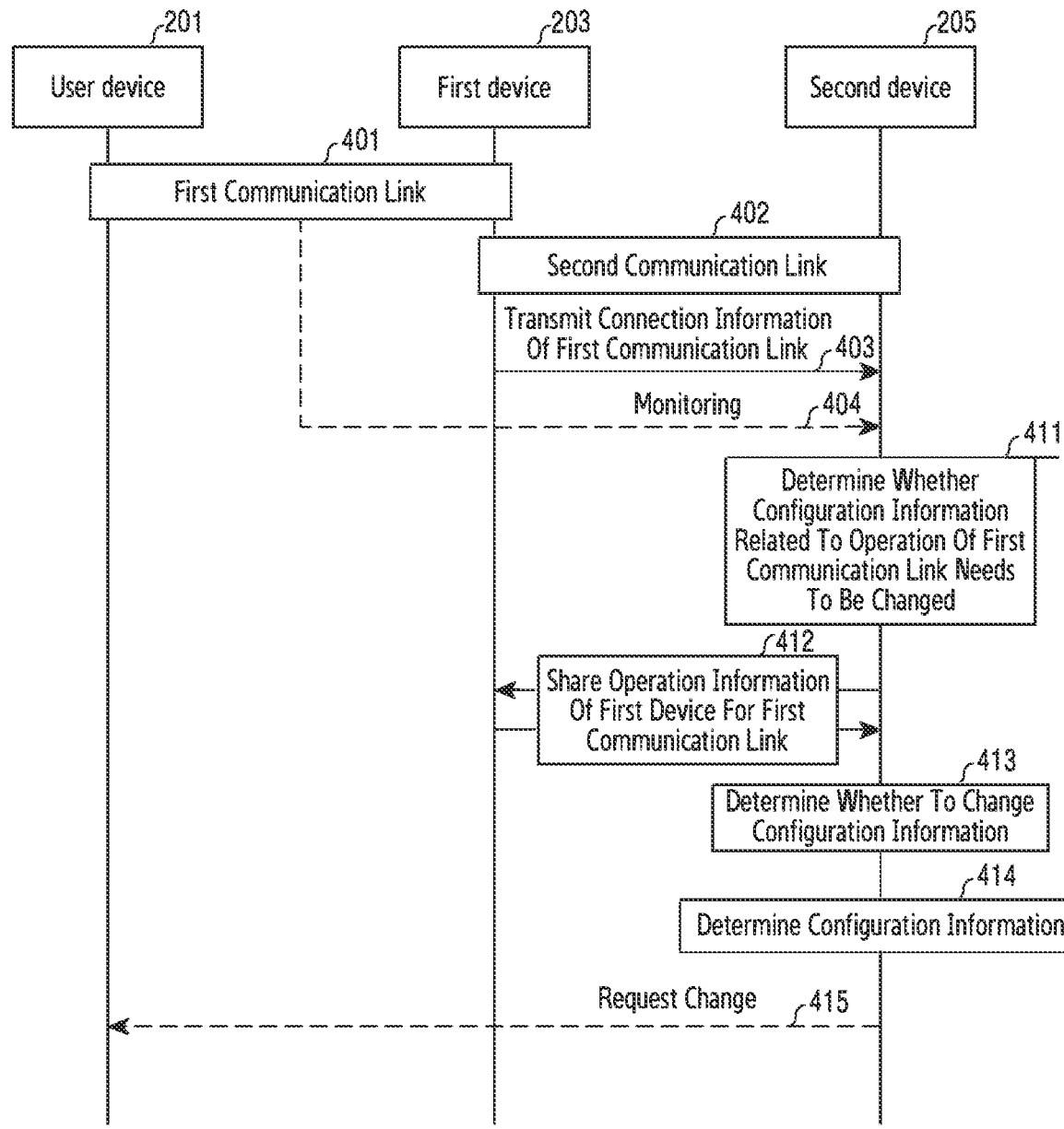
FIG. 4B illustrates another method for requesting a state change of a link operation element by a Bluetooth device indirectly connected to a user device according to an embodiment.

FIG. 4A illustrates a method for requesting a status change of a link operation element by a Bluetooth device indirectly connected to a user device according to an embodiment, and FIG. 4B illustrates another method for requesting a status change of the link operation element by a Bluetooth device indirectly connected to a user device according to an embodiment.

In FIGS. 3A and 3B, a method in which the first device 203 directly connected to the user device 201 requests a status change of the link operation element has been described, and in FIGS. 4A and 4B, a method of requesting a status change of a link operation element by the indirectly connected second device 205 will be described. In the following description, for the same or similar operation as that described in FIGS. 3A and 3B, the description thereof will be omitted.

Referring to FIGS. 4A and 4B, in operation 401, a user device 201 and a first device 203 may form (or create or establish) a first communication link (e.g., first communication link 211) via a wireless communication circuit (e.g., Bluetooth communication circuit).

In operation 402, the first device 203 and the second device 205 may form (or create or establish) a second communication link (e.g., second communication link 213) via the wireless communication circuit (e.g., Bluetooth communication circuit).

In operation 403, the first device 203 may transmit connection information associated with the first communication link to the second device 205 via the second communication link. For example, the connection information associated with the first communication link may include address information (e.g., Bluetooth address of a master device of the first communication link, Bluetooth address of the user device 201 and/or Bluetooth address of the first device 203), piconet clock information (e.g., CLKN of a master device of the first communication link), logical transport (LT) address information (e.g., information assigned by the master device of the first communication link), used channel map information, link key information, SDP information (e.g., service and/or profile information associated with the first communication link) and/or support feature information. In addition, the connection information associated with the first communication link may further include, for example, EIR packet. For example, the EIR packet may include resource control information of the first communication link and/or information about a manufacturer.

In operation 404, the second device 205 may monitor (e.g., monitoring 215) the first communication link, based on the connection information associated with the first communication link. For example, the second device 205 may calculate a channel access code and a hopping frequency of the first communication link, based on the connection information associated with the first communication link, and monitor the first communication link, based on the channel access code and the hopping frequency.

The above-described operations 401 to 404 may be identical or similar to operations 301 to 304 in FIGS. 3A and 3B. In addition, in operations 401 to 404, the case in which the first device 203 establishes a second communication link with the second device 205 and transmits connection information related to the first communication link to the second device 205 via the second communication link has been described, as in FIG. 2A, but the disclosure is not limited thereto. According to various embodiments, the operations may be replaced with operations corresponding to a case in which the user device 201 establishes a third communication link (e.g., third communication link 217) with the second device 205, and transmits connection information related to the first communication link to the second device 205 via the third communication link, as in FIG. 2B. According to an embodiment, the second device 205 may receive connection information related to the first communication link via an external server.

In the following operations, the operations may vary according to a device for determining the change request of the configuration information related to the operation of the first communication link. The operations of FIG. 4A correspond to a case where the first device 203 determines whether there is a request for changing the configuration information, and the operations of FIG. 4B correspond to a case where the second device 205 determines whether there is a request for changing the configuration information.

Referring to FIG. 4A, in operation 405, the first device 203 may determine whether a change of configuration information related to operation of the first communication link is required while the second device 205 monitors the first communication link. For example, the configuration information may be information indicating a configuration status of a resource used to operate the first communication link. That is, the configuration information may be information indicating a configuration status of a link operation element associated with the first communication link. The link operation element may include, for example, at least one of AFH, power control, CQDDR, LSTO, QoS, max slot, or packet type table (PTT).

According to an embodiment, the first device 203 may determine whether the configuration information needs to be changed, by determining a status change (e.g., position change) of the user device 201 and/or the first device 203, a status of the first communication link (e.g., network state), or occurrence of a communication failure due to an obstacle.

If it is determined that the configuration information needs to be changed, the first device 203 may transmit operation information of the first device 203 for the first communication link to the second device 205 via the second communication link, in operation 406. For example, the operation information of the first device 203 may be information representing a configurable status of resources used by the first device 203 to obtain (or receive) data via the first communication link. That is, the operation information of the first device 203 may be information representing a status of a link operation element associated with the first communication link necessary (or configurable) for the first device 203 to establish and maintain the first communication link.

The second device 205 that has received the operation information of the first device 203 may determine whether to change the configuration information, in operation 407. According to an embodiment, the second device 205 determine whether to change the configuration information, based on the operation information (first operation information) of the first device 203 with respect to the first communication link and the operation information (second operation information) of the second device 205 with respect to the first communication link. For example, the operation information of the second device 205 may be operation information representing a configurable state of a resource used by the second device 205 monitoring the first communication link to obtain (or receive) data via the first communication link. In other words, the operation information of the second device 205 may be information representing a state of a link operation element associated with the first communication link necessary (or configurable) for the second device 205 to monitor the first communication link.

The process of determining whether to change the configuration information may be identical or similar to the process of determining whether to change the configuration information, described in FIGS. 3A and 3B. However, in FIGS. 3A and 3B, the subject that determines whether to change the configuration information is the first device 203, but in FIGS. 4A and 4B, the second device 205 may determine whether to change the configuration information.

If it is determined that the change of the configuration information is impossible (or unnecessary), the second device 205 may omit the following operations (e.g., operations 408 and 409) so that the configuration information is maintained. According to an embodiment, the second device 205 may transfer feedback indicating that the configuration information cannot be changed, to the first device 203.

If it is determined that the change of the configuration information is possible (or necessary), the second device 205 may determine the configuration information, in operation 408. The second device 205 may determine the configuration information, based on an operation information (first operation information) of the first device and an operation information (second operation information) of the second device 205. Operation 408 may be identical or similar to operation 308 of FIG. 3A.

In operation 409, the second device 205 may request the user device 201 to change the configuration information as the first device 203 requests, based on the connection information associated with the first communication link. According to an embodiment, the second device 205 may transmit the determined configuration information to the user device 201. The user device 201 that is requested to change the configuration information may change the preconfigured configuration information for the first communication link, based on the configuration information received from the second device 205. For example, the user device 201 may change configuration state of the link operation element of the first communication link.

Referring to FIG. 4B, in a state in which the second device 205 monitors the first communication link, as in operation 411, the second device 205 may determine whether configuration information related to an operation of the first communication link needs to be changed. According to an embodiment, the second device 205 may determine whether change of the configuration information is necessary, by determining the state change (e.g., position change) of the user device 201 and/or the second device 205, the state of the first communication link (network state), or the occurrence of a communication failure factor due to an obstacle.

If it is determined that the configuration information needs to be changed, the second device 205 may share operation information of the first device 203 for the first communication link with the first device 203, in operation 412. For example, the second device 205 may request operation information of the first device 203 for the first communication link from the first device 203 via the second communication link, and the first device 203 may transmit operation information of the first device 203 for the first communication link to the second device 205 via the second communication link.

In operation 413, the second device 205 may determine whether to change the configuration information. According to an embodiment, the second device may determine whether to change the configuration information, based on operation information (first operation information) of the first device 203 with respect to the first communication link and operation information (second operation information) of the second device 205 with respect to the first communication link.

If it is determined that the change of the configuration information is impossible (or unnecessary), the second device 205 may omit the following operations (e.g., operations 414 and 415) so that the configuration information is maintained. If it is determined that the change of the configuration information is possible (or necessary), in operation 414, the second device 205 may determine the configuration information. The second device 205 may determine the configuration information, based on the operation information (first operation information) of the first device 203 and the operation information (second operation information) of the second device 205.

In operation 415, the second device 205 may request the user device 201 to change the configuration information as the first device 203 requests, based on connection information associated with the first communication link. According to an embodiment, the second device 205 may transmit the determined configuration information to the user device 201. The user device 201 that is requested to change the configuration information may change the preconfigured configuration information for the first communication link, based on the configuration information received from the second device 205. For example, the user device 201 may change the configuration state of the link operation element of the first communication link.

According to an embodiment, as a result of performing operation 411, if it is determined that the change of the configuration information is necessary, the second device 205 may transmit operation information for the first communication link to the first device 203 via the second communication link. The first device 203 that has received the operation information of the second device 205 for the first communication link may determine whether to change the configuration information, based on the operation information (first operation information) of the first device 203 for the first communication link and the operation information (second operation information) of the second device 205 for the first communication link. In addition, if it is determined that the change of configuration information is possible (or necessary), the first device 203 may determine the configuration information, based on the first operation information and the second operation information, and request the user device 201 to change to the configuration information via the first communication link.

Figure 5A:
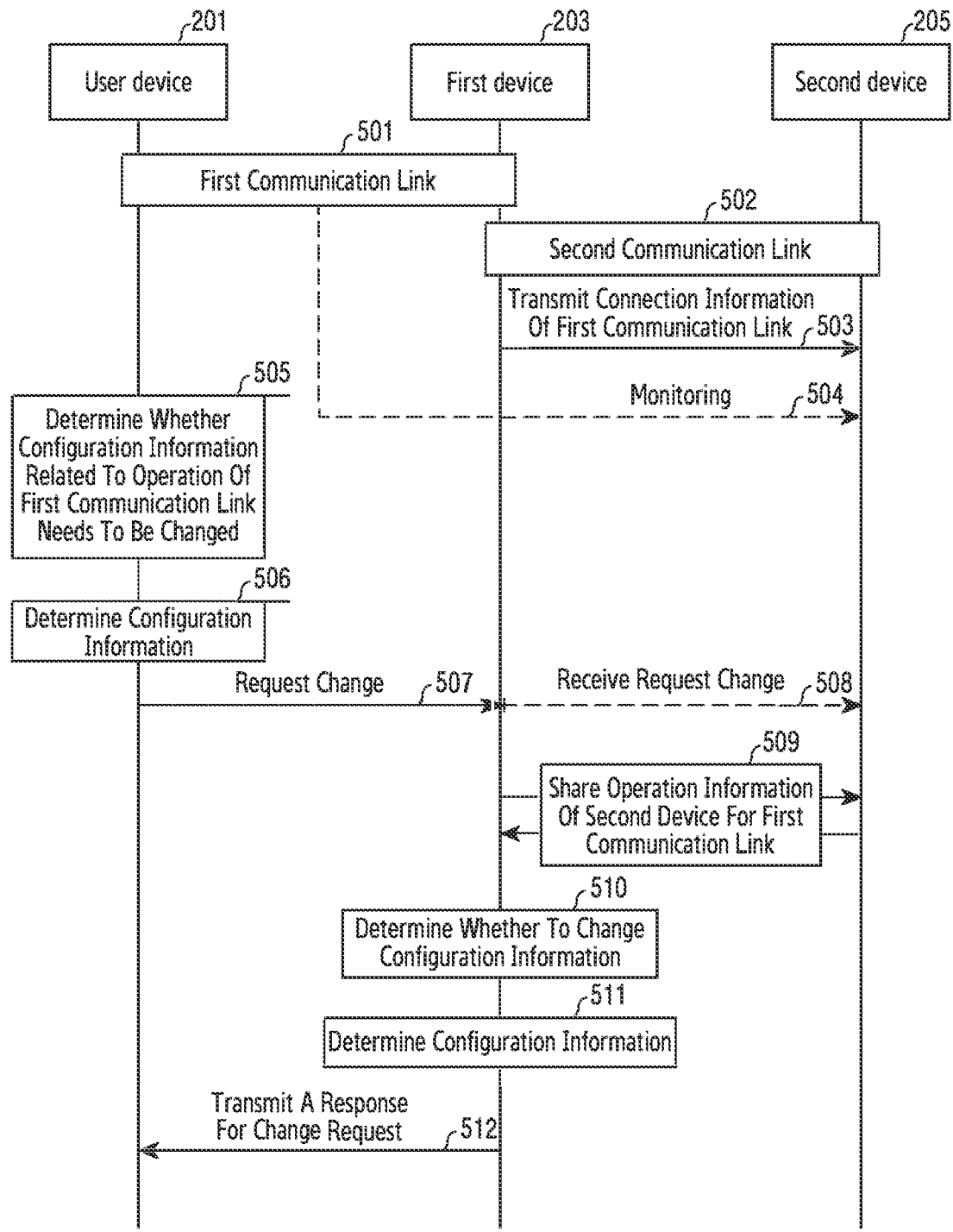
FIG. 5A illustrates a method for requesting a state change of a link operation element by a user device according to an embodiment.
Figure 5B:
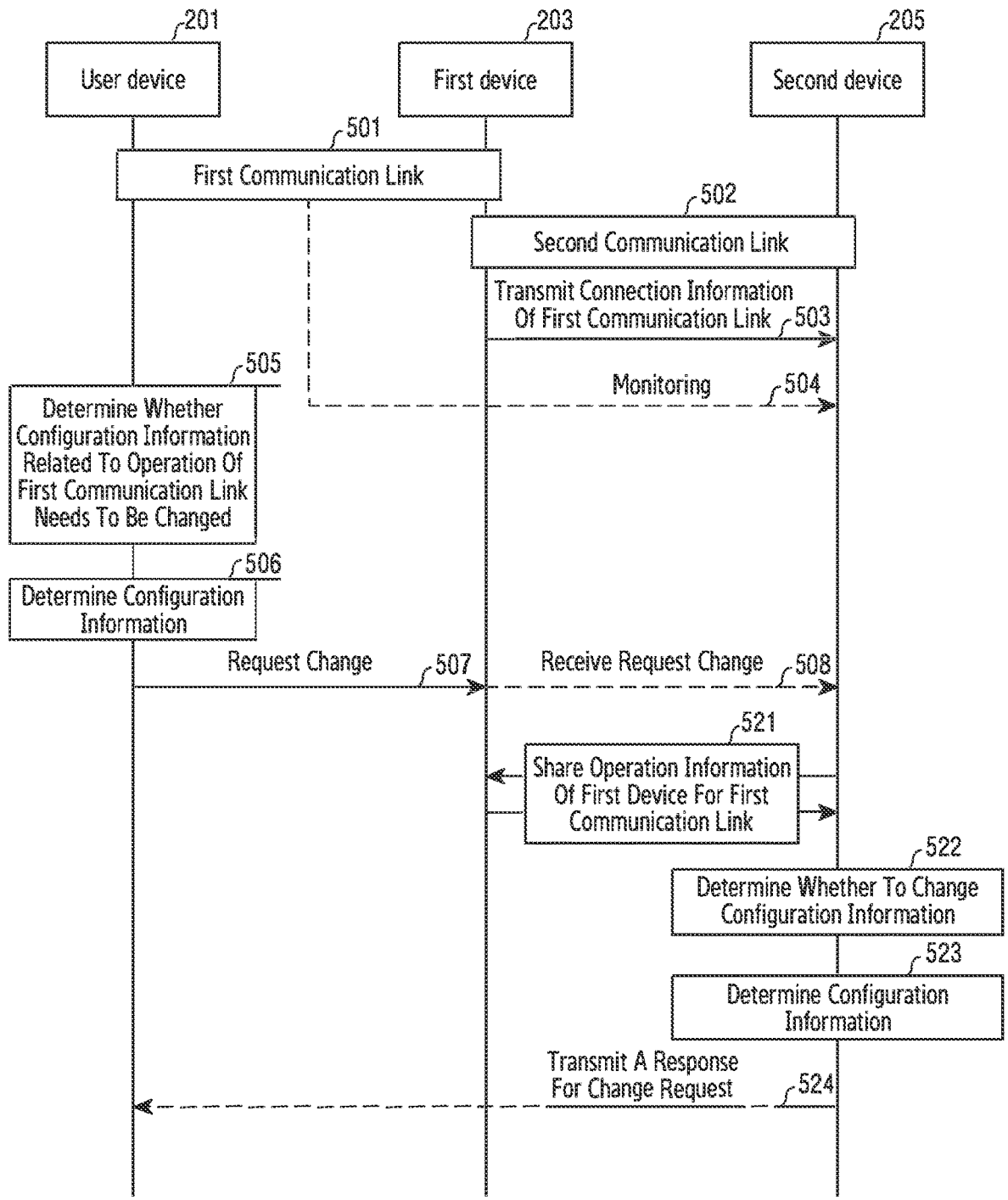
FIG. 5B illustrates another method for requesting a state change of a link operation element by a user device according to an embodiment.

FIG. 5A illustrates a method for requesting the status change of a link operation element by a user device according to an embodiment, and FIG. 5B illustrates another method for requesting the status change of a link operation element by a user device according to an embodiment.

In FIGS. 3A to 4B, a method in which the first device 203 directly connected to the user device 201 or the second device 205 indirectly connected to the user device 201 requests the status change of the link operation element has been described, and in FIGS. 5A and 5B, a method for requesting the status change of a link operation element by the user device 201 will be described. In the following description, the same or similar operations described in FIGS. 3A to 4B will be omitted.

Referring to FIGS. 5A and 5B, in operation 501, a user device 201 and a first device 203 may form (or create or establish) a first communication link (e.g., first communication link 211) via a wireless communication circuit (e.g., Bluetooth communication circuit).

In operation 502, the first device 203 and a second device 205 may form (or create or establish) a second communication link (e.g., second communication link 213) via the wireless communication circuit (e.g., Bluetooth communication circuit).

In operation 503, the first device 203 may transmit connection information associated with the first communication link to the second device 205 via the second communication link. For example, the connection information associated with the first communication link may include address information (e.g., Bluetooth address of a master device of the first communication link, Bluetooth address of the user device 201 and/or Bluetooth address of the first device 203), piconet clock information (e.g., CLKN of a master device of the first communication link), logical transport (LT) address information (e.g., information assigned by a master device of the first communication link), used channel map information, link key information, SDP information (e.g., service and/or profile information associated with the first communication link), and/or supported feature information. In addition, the connection information associated with the first communication link may further include, for example, EIR packet. For example, the EIR packet may include resource control information of the first communication link and/or information about a manufacturer.

In operation 504, the second device 205 may monitor (e.g., monitoring 215) the first communication link, based on connection information associated with the first communication link. For example, the second device 205 may calculate a channel access code and a hopping frequency of the first communication link, based on the connection information associated with the first communication link, and monitor the first communication link, based on the channel access code and the hopping frequency.

The above-described operations 501 to 504 may be identical or similar to operations 301 to 304 in FIGS. 3A and 3B, or operations 401 to 404 in FIGS. 4A and 4B. In addition, in operations 501 to 504, the case in which the first device 203 establishes the second communication link with the second device 205 and transmits connection information related to the first communication link to the second device 205 via the second communication link has been described, as in FIG. 2A, but it is not limited thereto. According to various embodiments, the operations may be replaced with operations corresponding to a case in which the user device 201 establishes a third communication link (e.g., third communication link 217) with the second device 205, and transmits connection information related to the first communication link to the second device 205 via the third communication link, as in FIG. 2B. According to an embodiment, the second device 205 may receive connection information related to the first communication link via an external server.

In operation 505, the user device 201 may determine whether the configuration information related to an operation of the first communication link needs to be changed. For example, the configuration information may be information indicating a configuration status of a resource used to operate the first communication link. That is, the configuration information may be information indicating a configuration status of a link operation element associated with the first communication link. The link operation element may include, for example, at least one of AFH, power control, CQDDR, LSTO, QoS, max slot, or packet type table (PTT).

According to an embodiment, the user device 201 may determine whether the configuration information needs to be changed, by determining status change (e.g., position change) of the user device 201 and/or the first device 203, a state of the of the first communication link (e.g., network state), or the occurrence of a communication failure due to an obstacle.

If it is determined that the change of the configuration information is necessary, the user device 201 may determine configuration information, in operation 506. If the configuration information is determined, the user device 201 may request the first device 203 to change the configuration information via the first communication link, in operation 507. At this time, the second device 205 may monitor the first communication link to receive the change request. According to an embodiment, the user device 201 may transfer the determined configuration information to the first device 203.

According to an embodiment, if the second device 205 cannot receive the change request normally in operation 508, the first device 203 may transmit the change request to the second device 205. Alternatively, if the second device 205 cannot receive the change request normally, the user device 201 may retransmit the change request via the first communication link.

The method of transmitting or retransmitting the change request to the second device 205 may be performed through a method of transmitting a response message (e.g., ACK message or NACK message) indicating that the first device 203 or the second device 205 has received data normally. For example, the first device 203 and the second device 205 may negotiate and determine a method for transmitting the response message to the user device 201, and the first device 203 and/or the second device 205 may transmit information indicating whether to receive the change request to the user device 201, via the response message. Also, according to the determined method, the first device 203 may transfer the change request to the second device 205 or the user device 201 may resend the change request.

According to an embodiment, the first device 203 that has received the change request may change the preconfigured configuration information for the first communication link, based on the configuration information of the first device 203 received from the user device 201. For example, the first device 203 may change the configuration state of the link operation element of the first communication link.

According to an embodiment, the configuration information may be determined whether to be changed again, based on the operation information (first operation information) of the first device 203 for the first communication link and the operation information (second operation information) of the second device 205 for the first communication link. For example, when the configuration information for the first communication link is changed, the second device 205 may not be able to obtain data from the user device 201. Accordingly, the configuration information may be determined whether to be changed, in consideration of operation information of the second device 205 for the first communication link so that the second device 205 can smoothly monitor the first communication link. The first operation information may be information indicating a state of the link operation element associated with the first communication link which is necessary (or configurable) for the first device 203 to establish and maintain the first communication link, and the second operation information may be information indicating a state of the link operation element associated with the first communication link which is necessary (or configurable) for the second device 205 to monitor the first communication link.

In the following operations, the operations may vary depending on a device for determining whether to re-change the configuration information related to the operation of the first communication link. Operations of FIG. 5A correspond to a case in which the first device 203 determines whether to change the configuration information, and operations in FIG. 5B correspond to a case in which the second device 205 determines whether to rechange the configuration information.

Referring to FIG. 5A, in operation 509, the first device 203 may share operation information of the second device 205 with respect to the first communication link with the second device 205. For example, the first device 203 may request operation information of the second device 205 for the first communication link from the second device 205 via the second communication link, and the second device 205 may transmit operation information of the second device 205 for the first communication link to the first device 203 via the second communication link.

In operation 510, the first device 203 may determine whether to rechange configuration information. According to an embodiment, the first device 203 may determine whether to rechange the configuration information, based on the operation information (first operation information) of the first device 203 with respect to the first communication link and the operation information (second operation information) of the second device 205 with respect to the first communication link.

If it is determined that the re-change of the configuration information is impossible (or unnecessary), the first device 203 may omit the following operations (e.g., operations 511 and 512) so that the configuration information is maintained.

If it is determined that the re-change of the configuration information is possible (or necessary), in operation 511, the first device 203 may redetermine the configuration information. The first device 203 may redetermine the configuration information, based on the operation information (first operation information) of the first device 203 and the operation information (second operation information) of the second device 205, and rechange the preconfigured configuration information, based on the redetermined configuration information.

In operation 512, the first device 203 may transmit a response for the change request to the user device 201 via the first communication link.

According to an embodiment, the first device 203 that has received the change request, may perform different operations according to the type of the configuration information requested to be changed. For example, the first device 203 may not transmit a response for the change request. For example, the first device 203 may omit operation 512. The first device 203 may transfer only an ACK message for the change request to the user device 201 and change the requested configuration information, when the type of configuration information requested for change is related to, for example, AFH or LSTO.

For another example, when the type of configuration information requested for change is related to, for example, power control, the first device 203 may transfer an ACK message for the change request to the user device 201, change the configuration information requested for change, and transmit a response for the change of configuration information to the user device 201. For example, after changing the configuration information according to the change request, the first device 203 may determine whether to rechange the configuration information as in operation 510, if it is determined that the rechange of the configuration information is possible (or necessary), re-determine the configuration information as in operation 511, rechange the preconfigured configuration information, based on the re-determined configuration information, and transmit information indicating that the configuration information has been rechanged to the user device 201, in operation 512.

For yet another example, when the configuration information requested for change is related to, for example, CQDDR, QoS, max slot, or EDR, the first device 203 may transfer an ACK message for the change request to the user device 201, and after determining whether the configuration information can be changed, may transmit a response to the change of the configuration information to the user device 201, according to the determination result. For example, when receiving the change request, the first device 203 may determine whether to change the configuration information as in operation 510, and if it is determined that the configuration information can be changed, the first device 203 may change the change-requested configuration information, and transmit information indicating that the configuration information has been changed to the user device 201, in operation 512. Alternatively, if it is determined that the change of the configuration information is impossible, the first device 203 may maintain the change-requested configuration information without changing and transmit information indicating that the configuration information has not been changed to the user device 201, in operation 512. In some embodiments, the first device 203 may not change the configuration information as requested to change according to the determination whether to change in operation 510, and may newly determine to change the configuration information, based on the operation information of the first device 203 and the operation information of the second device 205, as in operation 511. In this case, the first device 203 may transmit information indicating that the configuration information is changed differently from the change request to the user device 201, in operation 512.

The above-described operations of FIG. 5A will be described in detail with an example of configuration information related to channel change.

According to an embodiment, when the user device 201 acts as a master, the user device 201 may request the AFH change to the first device 203. In this case, after receiving the AFH change request, the first device 203 may identify whether the second device 205 has received the AFH change request. If the second device 205 has not received the AFH change request normally, the first device 203 may transfer the AFH change request to the second device 205. In addition, the first device 203 may receive information (hereinafter, referred to as channel information) indicating a state of each channel of the second device 205, and may determine whether the surrounding wireless environment of the second device 205 is difficult to secure link quality with the changed AFH, based on the received channel information. If it is determined that the secure of link quality is difficult, the first device 203 may determine channel information that can ensure link quality in both the first device 203 and the second device 205, based on the channel information of the first device 203 and the channel information of the second device 205, and request channel classification to the user device 201, based on the determined channel information.

According to an embodiment, when the user device 201 acts as a slave, the user device 201 may request channel classification to the first device 203. The first device 203 may receive channel information of the second device 205 from the second device 205, determine channel information that can secure link quality, based on the channel information received from the user device 201, channel information of the first device 203 and channel information of the second device 205, and request the user device 201 to change AFH, based on the determined channel information.

Referring to FIG. 5B, when the second device 205 monitoring the first communication link receives the change request, in operation 521, the second device 205 may share operation information of the first device 203 for the first communication link with the first device 203. For example, the second device 205 may request operation information of the first device 203 for the first communication link to the first device 203 via the second communication link, and the first device 203 may transmit operation information of the first device 203 for the first communication link to the second device 205 via the second communication link.

In operation 522, the second device 205 may determine whether to re-change the configuration information. According to an embodiment, the second device 205 may determine whether to re-change the configuration information, based on the operation information (first operation information) of the first device 203 for the first communication link and the operation information (second operation information) of the second device 205 for the first communication link.

If it is determined that the re-change of the configuration information is impossible (or unnecessary), the second device 205 may omit the following operations (e.g., operations 523 and 524) so that the configuration information is maintained. According to an embodiment, the second device 205 may transmit a feedback indicating that the rechange of the configuration information of the first device 203 is impossible (or unnecessary) to the first device 203.

If it is determined that the re-change of the configuration information is possible (or necessary), the second device 205 may re-determine the configuration information, in operation 523. The second device 205 may re-determine the configuration information, based on the operation information (first operation information) of the first device 203 and the operation information (second operation information) of the second device 205. In addition, the second device 205 may transfer the re-determined configuration information to the first device 203 via the second communication link, and the first device 203 may re-change the preconfigured configuration information, based on the re-determined configuration information received from the second device 205.

In operation 524, the second device 205 may transmit a response for the change request to the user device 201, based on connection information related to the first communication link, as the first device 203 transmits.

According to an embodiment, the second device 205 that has received the change request may perform different operations according to the type of the change-requested configuration information. For example, the second device 205 may not transmit a response for the change request. For example, the second device 205 may omit operation 524. When the type of the change-requested configuration information is related to, for example, AFH or LSTO, the second device 205 may transfer only an ACK message for the change request to the user device 201, and transfer the change-requested configuration information to the first device 203 so that the change-requested configuration information is changed.

For another example, when the type of change-requested configuration information relates to, for example, power control, the second device 205 may transfer an ACK message for the change request to the user device 201, transfer the change-requested configuration information to the first device 203 so that the change-requested configuration information is changed, and transmit a response for the change of configuration information to the user device 201. For example, after the second device 205 transfers the change-requested configuration information to the first device 203 so that the configuration information is changed according to the change request, the second device 205 may determine whether to re-change the configuration information as in operation 522. If it is determined that the re-change of the configuration information is possible (or necessary), the second device 205 may re-determine the configuration information as in operation 523, transfer the re-determined configuration information to the first device 203, and transmit information indicating that the configuration information has been re-changed to the user device 201, in operation 524.

For yet another example, when the type of change-requested configuration information is related to, for example, CQDDR, QoS, max slot, or EDR, the second device 205 may transfer an ACK message for the change request to the user device 201, and after determining whether the change of the configuration information is possible, transmit a response for the change of the configuration information to the user device 201 according to the determination result. For example, upon receiving the change request, the second device 205 may determine whether to change the configuration information as in operation 522. If it is determined that the change of the configuration information is possible, the second device 205 may transfer the change-requested configuration information to the first device 203, and may transmit information indicating that the configuration information has been changed to the user device 201, in operation 524. Alternatively, if it is determined that the change of the configuration information is impossible, the second device 205 may not transmit the change-requested configuration information to the first device 203 and transmit information indicating that the configuration information has not been changed to the user device 201, in operation 524. In some embodiments, the second device 205 may not transmit the change-requested configuration information to the first device 203 so that the configuration information is not changed as the change-request, according to the determination whether to change the configuration information in operation 522. The second device 205 may newly determine the configuration information, based on the operation information of the first device 203 and the operation information of the second device 205, and transfer the determined configuration information to the first device 203, as in operation 523. In this case, in operation 524, the second device 205 may transmit information indicating that the configuration information is changed differently from the change request to the user device 201.

The above-described operations of FIG. 5B will be described in detail with an example of configuration information related to channel change.

According to an embodiment, when the user device 201 perform as a master, the user device 201 may request the first device 203 to change AFH via the first communication link. In this case, the second device 205 may monitor the first communication link to receive an AFH change request. The second device 205 that has received the AFH change request may receive channel information of the first device 203, and determine whether the surrounding wireless environment of the first device 203 is difficult to secure link quality with the AFH, based on the received channel information. If it is determined that securing the link quality is difficult, the second device 205 may determine channel information capable for securing link quality in both the first device 203 and the second device 205, based on the channel information of the first device 203 and the channel information of the second device 205, and request channel classification to the user device 201, based on the determined channel information.

According to an embodiment, when the user device 201 acts as a slave, the user device 201 may request channel classification to the first device 203 via the first communication link. At this time, the second device 205 may monitor the first communication link to receive a channel classification request. The second device 205 that has received the channel classification request may receive channel information of the first device 203 from the first device 203, determine channel information capable of securing link quality, based on the channel information of the first device 203 and the channel information of the second device 205 received from the user device 201, and request the user device 201 to change the AFH, based on the determined channel information.

Figure 6:
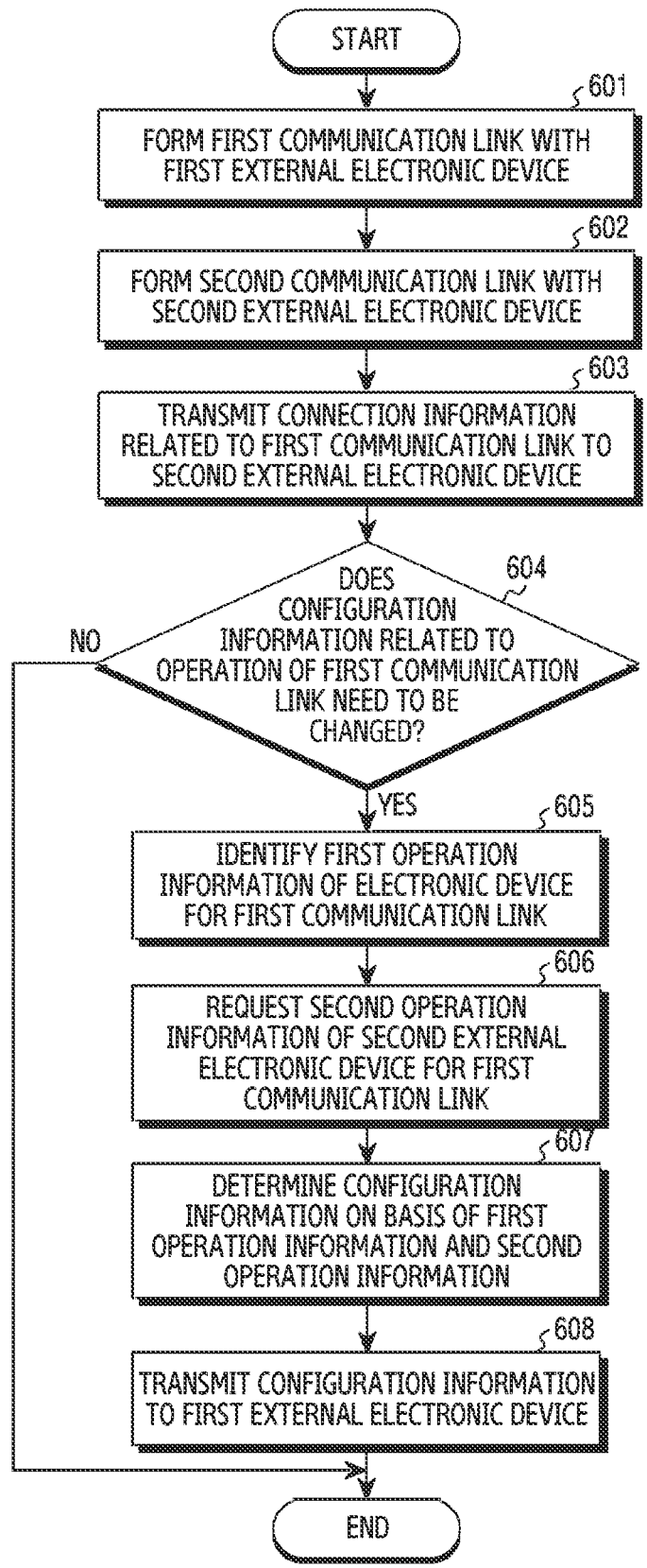
FIG. 6 illustrates a method for operating a Bluetooth device directly connected to a user device according to an embodiment.

FIG. 6 illustrates a method for operating a Bluetooth device directly connected to a user device according to an embodiment.

Referring to FIG. 6, in operation 601, an electronic device (e.g., first electronic device 203) may form (or create or establish) a first communication link (e.g., first communication link 211) with a first external electronic device (e.g., user device 201) through a wireless communication circuit (e.g., Bluetooth communication circuit).

In operation 602, the electronic device may form (or create or establish) a second communication link (e.g., second communication link 213) with a second external electronic device (e.g., second device 205) through the wireless communication circuit (e.g., Bluetooth communication circuit). A method for establishing the second communication link may be identical or similar to the method for establishing the first communication link. In addition, the second communication link may be established first before the first communication link is established. For example, the electronic device may establish a first communication link with the first external electronic device after establishing the second communication link with the second external electronic device.

In operation 603, the electronic device may transmit connection information related to the first communication link to the second external electronic device. For example, the connection information associated with the first communication link may include address information (e.g., Bluetooth address of a master device of the first communication link, Bluetooth address of the first external electronic device and/or Bluetooth address of the electronic device), piconet clock information (e.g., CLKN of a master device of the first communication link), logical transport (LT) address information (e.g., information allocated by a master device of the first communication link), used channel map information, link key information, SDP information (e.g., service and/or profile information related to the first communication link), and/or supported feature information. In addition, the connection information related to the first communication link may further include, for example, an extended inquiry response (EIR) packet. For example, the EIR packet may include resource control information of the first communication link and/or information on a manufacturer.

According to an embodiment, the connection information may be transmitted by the first external electronic device to the second external electronic device. For example, the first external electronic device may establish a third communication link (e.g., third communication link 217) with the second external electronic device and transmit the connection information related to the first communication link to the second external electronic device via the third communication link. In this case, operation 603 may be omitted.

The second external electronic device that has received the connection information associated with the first communication link may monitor (e.g., monitoring 215) the first communication link, based on the connection information. For example, the second external electronic device may calculate a channel access code and a hopping frequency of the first communication link, based on the connection information, and monitor the first communication link, based on the channel access code and the hopping frequency.

In operation 604, the electronic device may determine whether configuration information related to an operation of the first communication link needs to be changed. For example, the configuration information may be information indicating a configuration state of a resource used to operate the first communication link. That is, the configuration information may be information indicating a configuration state of a link operation element associated with the first communication link. The link operation element may include, for example, at least one of AFH, power control, CQDDR, LSTO, QoS, max slot, or PTT.

According to an embodiment, the electronic device may determine whether the configuration information needs to be changed, by determining a state change (e.g., position change) of the first external electronic device and/or the electronic device, a state (network state) of the first communication link, or the occurrence of a communication failure due to an obstacle.

If it is determined that the configuration information needs to be changed, the electronic device may identify the first operation information of the electronic device for the first communication link, in operation 605. For example, the first operation information may be information indicating a configurable state of a resource used by the electronic device to acquire (or receive) data via the first communication link. That is, the first operation information may be information indicating a state of a link operation element associated with the first communication link necessary (or configurable) for the electronic device to establish and maintain the first communication link.

In operation 606, the electronic device may request the second operation information of the second external electronic device for the first communication link to the second external electronic device. For example, the second operation information may be information indicating a configurable state of a resource used by the second external electronic device monitoring the first communication link to acquire (or receive) data via the first communication link. That is, the second operation information may be information indicating a state of a link operation element associated with the first communication link necessary (or configurable) for the second external electronic device to monitor the first communication link.

In operation 607, the electronic device may determine the configuration information, based on the first operation information and the second operation information. For example, when each of the first operation information and the second operation information includes a numerical value, the electronic device may determine an average value of the first operation information and the second operation information as the configuration information. Alternatively, the electronic device may determine a smaller value or a larger value from the first operation information or the second operation information. As another example, when each of the first operation information and the second operation information includes a range value, the electronic device may determine a common partial value of the range value of the first operation information and the range value of the second operation information as the configuration information.

In operation 608, the electronic device may transmit the determined configuration information to the first external electronic device via the first communication link. For example, the electronic device may request the first external electronic device to change the configuration information.

In FIG. 6 described above, there has been described the method in which the electronic device identifies the operation information (second operation information) of the second external electronic device for the first communication link and then requests the first external electronic device to change the configuration information, but it is not limited thereto. According to an embodiment, after the electronic device requests the first external electronic device to change the configuration information, the electronic device may identify operation information (second operation information) of the second external electronic device for the first communication link, and if it is determined that the configuration information needs to be re-changed, may request the first external electronic device to re-change the configuration information.

Figure 7:
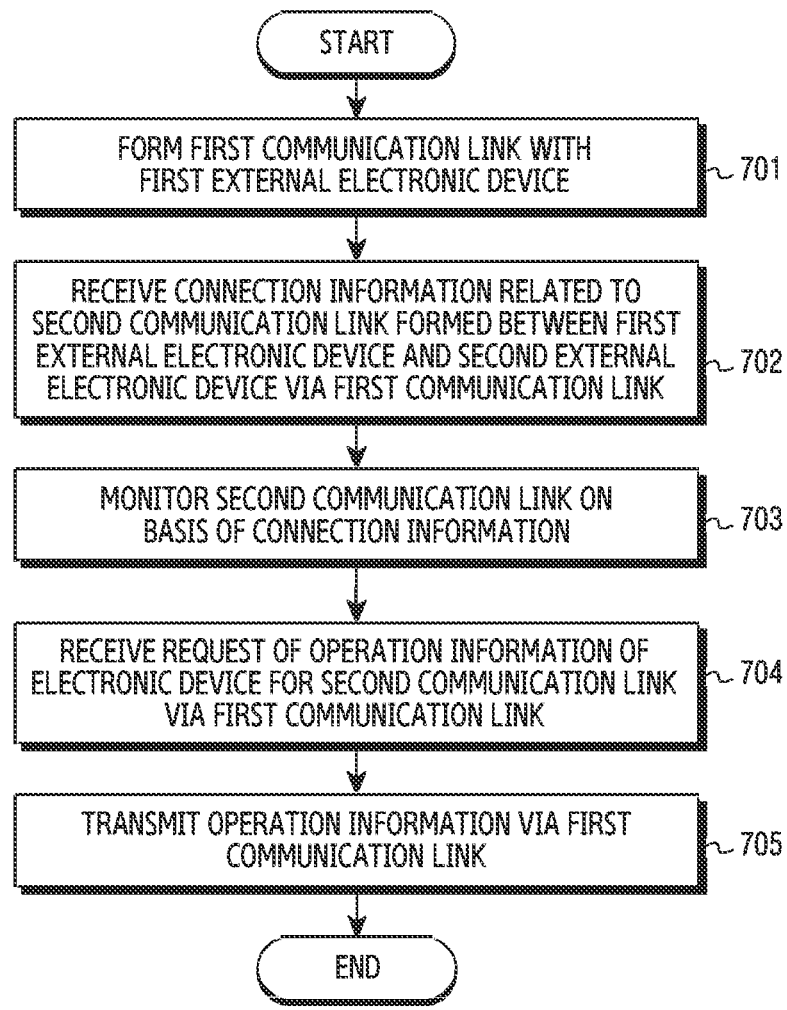
FIG. 7 illustrates a method for operating a Bluetooth device indirectly connected to a user device according to an embodiment.

FIG. 7 illustrates a method for operating a Bluetooth device indirectly connected to a user device according to an embodiment of the disclosure.

Referring to FIG. 7, an electronic device (e.g., second device 205) may form (or create or establish) a first communication link (e.g., second communication link 213) with a first external electronic device (e.g., first device 203) via a wireless communication circuit (e.g., Bluetooth communication circuit), in operation 701.

In operation 702, the electronic device may receive connection information associated with a second communication link (e.g., first communication link 211) established between the first external electronic device and a second external electronic device (e.g., user device 201) via the first communication link. For example, the connection information associated with the second communication link may include address information (e.g., Bluetooth address of a master device of the second communication link, Bluetooth address of the first external electronic device and/or Bluetooth address of the second external electronic device), piconet clock information (e.g., CLKN of a master device of the second communication link), logical transport (LT) address information (e.g., information allocated by a master device of the second communication link), used channel map information, link key information, SDP information (e.g., service and/or profile information related to the second communication link), and/or supported feature information. In addition, the connection information related to the second communication link may further include, for example, an EIR packet. For example, the EIR packet may include resource control information of the second communication link and/or information on a manufacturer.

According to an embodiment, the connection information may be transmitted by the second external electronic device to the electronic device. For example, the second external electronic device may establish a third communication link (e.g., third communication link 217) with the electronic device and transmit the connection information related to the second communication link to the electronic device via the third communication link.

In operation 703, the electronic device may monitor (e.g., monitoring 215) the second communication link, based on the connection information. For example, the electronic device may calculate a channel access code and a hopping frequency of the second communication link, based on the connection information, and monitor the second communication link, based on the channel access code and the hopping frequency.

In operation 704, the electronic device may receive a request for operation information of the electronic device for the second communication link via the first communication link. For example, the first external device may request operation information of the electronic device for the second communication link from the electronic device via the first communication link, and the electronic device may receive the request. For example, the operation information may be information indicating a configurable state of a resource used by the electronic device for monitoring the second communication link to obtain (or receive) data via the second communication link. That is, the operation information may be information indicating a state of a link operation element associated with the second communication link necessary (or configurable) for the electronic device to monitor the second communication link.

In operation 705, the electronic device may transmit the operation information to the first external electronic device via the first communication link.

Figure 8:
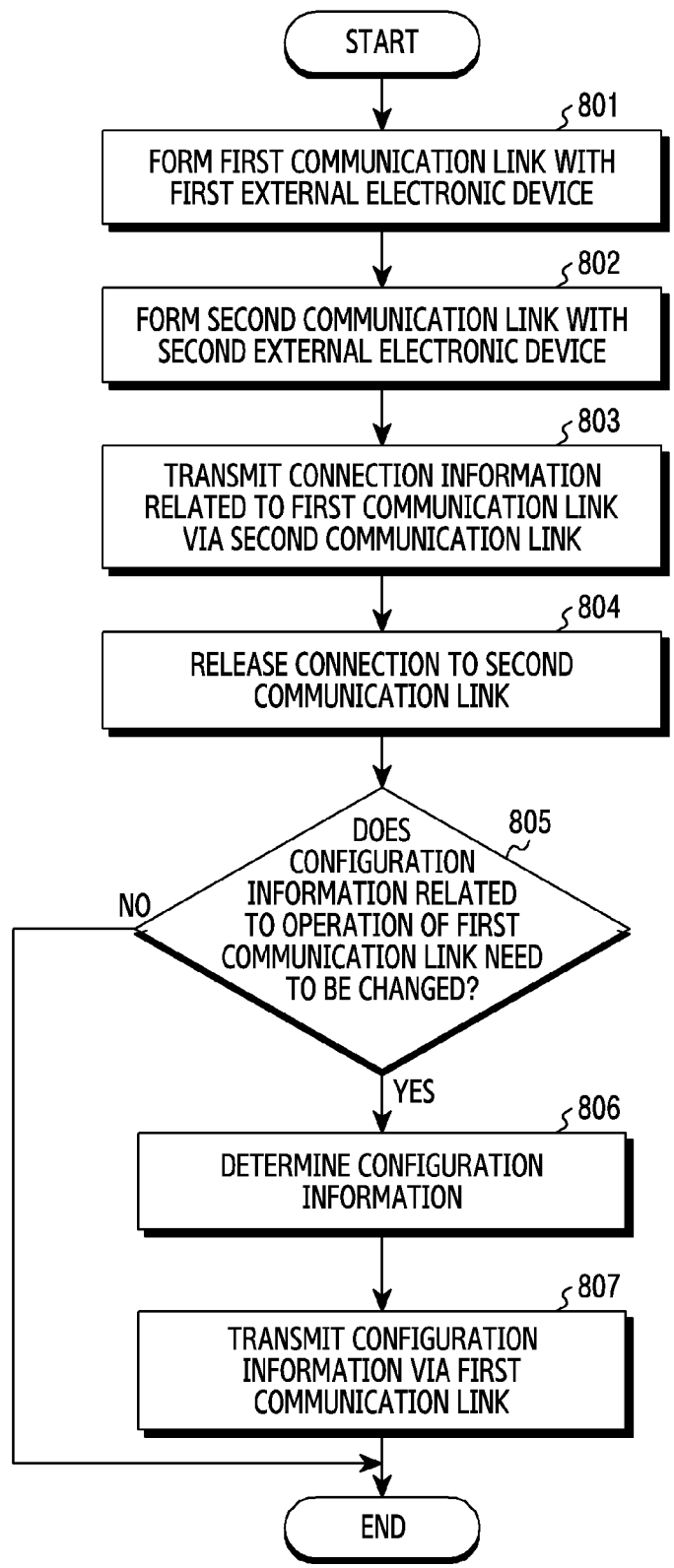
FIG. 8 illustrates a method for operating a user device according to an embodiment.

FIG. 8 illustrates a method for operating a user device according to an embodiment.

Referring to FIG. 8, in operation 801, an electronic device (e.g., user device 201) may form (or create or establish) a first communication link (e.g., first communication link 211) with a first external electronic device (e.g., first device 203) via a wireless communication circuit (e.g., Bluetooth communication circuit).

In operation 802, the electronic device may form (or create or establish) a second communication link (e.g., third communication link 217) with a second external electronic device (e.g., second device 205) via the wireless communication circuit (e.g., Bluetooth communication circuit). The method for establishing the second communication link may be identical or similar to the method for establishing the first communication link. Also, the second communication link may be established first before the first communication link is established. For example, the electronic device may establish the first communication link with the first external electronic device after establishing the second communication link with the second external electronic device.

In operation 803, the electronic device may transmit connection information related to the first communication link to the second external electronic device via the second communication link. For example, the connection information associated with the first communication link may include address information (e.g., Bluetooth address of a master device of the first communication link, Bluetooth address of the electronic device and/or Bluetooth address of the first external electronic device), piconet clock information (e.g., CLKN of a master device of the first communication link), logical transport (LT) address information (e.g., information allocated by a master device of the first communication link), used channel map information, link key information, SDP information (e.g., service and/or profile information related to the first communication link), and/or supported feature information. In addition, the connection information related to the first communication link may further include, for example, an EIR packet. For example, the EIR packet may include resource control information of the first communication link and/or information on a manufacturer.

The second external electronic device that has received the connection information related to the first communication link may monitor (e.g., monitoring 215) the first communication link, based on the connection information. For example, the second external electronic device may calculate a channel access code and a hopping frequency of the first communication link, based on the connection information, and monitor the first communication link, based on the channel access code and the hopping frequency.

In operation 804, the electronic device may release (or terminate) the connection to the second communication link. For example, the electronic device may release the connection to the second communication link, under determination that the connection information is normally transmitted to the second external electronic device. In some embodiments, the electronic device may omit performing operation 804. For example, the electronic device may maintain the second communication link.

In operation 805, the electronic device may determine whether configuration information related to the operation of the first communication link needs to be changed. For example, the configuration information may be information indicating a configuration state of a resource used to operate the first communication link. That is, the configuration information may be information indicating a configuration state of a link operation element associated with the first communication link. The link operation element may include, for example, at least one of AFH, power control, CQDDR, LSTO, QoS, max slot, or PTT.

According to an embodiment, the electronic device may determine whether the configuration information needs to be changed by determining state change (e.g., location change) of the first external electronic device and/or the electronic device, the state of the first communication link (network state), or the occurrence of a communication failure due to an obstacle.

If it is determined that the configuration information needs to be changed, the electronic device may determine the configuration information, in operation 806. According to an embodiment, the electronic device may determine the configuration information, based on the determination result for the state change (e.g., location change) of the electronic device and/or the first external electronic device, the state of the first communication link (network state), or the occurrence of a communication failure due to an obstacle.

When the configuration information is determined, in operation 807, the electronic device 201 may transmit the determined configuration information to the first external electronic device via the first communication link. For example, the electronic device may request the first external electronic device to change the configuration information via the first communication link.

As described above, according to various embodiments, a method for configuring a wireless communication link may include: an operation of establishing a first communication link (e.g., first communication link 211), by a user device (e.g., user device 201) and a first device (e.g., first device 203); an operation of establishing a second communication link (e.g., second communication link 213), by the first device and a second device (e.g., second device 205); an operation of transmitting, by the first device, connection information related to the first communication link to the second device via the second communication link; an operation of monitoring, by the second device, the first communication link, based on the connection information; an operation of determining, by the first device, that configuration information related to the operation of the first communication link needs to be changed; an operation of identifying, by the first device, first operation information of the first electronic device for the first communication link and requesting second operation information of the second device for the first communication link to the second device via the second communication link upon determining that the configuration information needs to be change; an operation of determining, by the first device, whether to change of the configuration information, based on the first operation information and the second operation information, if the first device receives the second operation information from the second device; an operation of determining, by the first device, a change value of the configuration information, based on the first operation information and the second operation information, on the basis of determining the change of the configuration information; and an operation of transmitting, by the first device, the change value of the configuration information to the user device via the first communication link.

According to various embodiments, the configuration information may include at least one of adaptive frequency hopping (AFH), power control, channel quality driven data rate change (CQDDR), link supervision timeout (LSTO), quality of service (QoS), max slot, and packet type table (PTT).

According to various embodiments, the determining whether the configuration information needs to be changed may include an operation of determining whether the configuration information needs to be changed, based at least on a state change of the user device or the first device, a state of the first communication link, or the occurrence of communication failure due to an obstacle.

According to various embodiments, when changing the configuration information, in the monitoring, by the second device, the first communication link, if it is determined that the second device cannot receive data transmitted from the user device via the first communication link, the method may further include an operation of controlling the changed value of the determined configuration information not to be transmitted to the user device.

According to various embodiments, if the value indicated by the second operation information is out of a range indicated by the determined change value of the configuration information, the method may further include an operation of determining that the second device cannot receive data transmitted from the user device via the first communication link.

According to various embodiments, the determining the configuration information may include an operation of determining an average value of a first value indicated by the first operation information and a second value indicated by the second operation information, a smaller value between the first value and the second value, or a larger value as the change value of the configuration information, if each of the first operation information and the second operation information includes a numerical value, and an operation of determining a third range value corresponding to a common part of a first range value indicated by the first operation information and a second range value indicated by the second operation information as the change value of the configuration information, if each of the first operation information and the second operation information includes a range value.

According to various embodiments, the connection information may include at least one of address information of the user device, address information of the first device, piconet clock information, logical transport address information, used channel map information, link key information, service discovery protocol (SDP) information, supported feature information, or extended inquiry response (EIR) packet, and the monitoring may include an operation of calculating a channel access code and a hopping frequency of the first communication link, based on the connection information, and an operation of monitoring the first communication link, based on the channel access code and the hopping frequency.

According to various embodiments, the method may further include an operation of determining, by the second device, that the configuration information related to the operation of the first communication link needs to be changed, an operation of identifying, by the second device, the second operation information and requesting the first operation information to the first device via the second communication link upon determining that the configuration information needs to be changed, an operation of determining, by the second device, whether to change the configuration information, based on the first operation information and the second operation information if the second device receives the first operation information from the first device, an operation of determining, by the second device, a change value of the configuration information, based on the first operation information and the second operation information, on basis of the determining to change the configuration information, and an operation of transmitting, by the second device, the determined change value of the configuration information to the user device, based on the connection information.

According to various embodiments, the method may further include an operation of determining, by the user device, that the configuration information related to the operation of the first communication link needs to be changed, an operation of determining, by the user device, a change value of the configuration information upon determining that the configuration information needs to be changed, and an operation of transmitting, by the user device, the determined change value of the configuration information to the first device via the first communication link.

Figure 9:
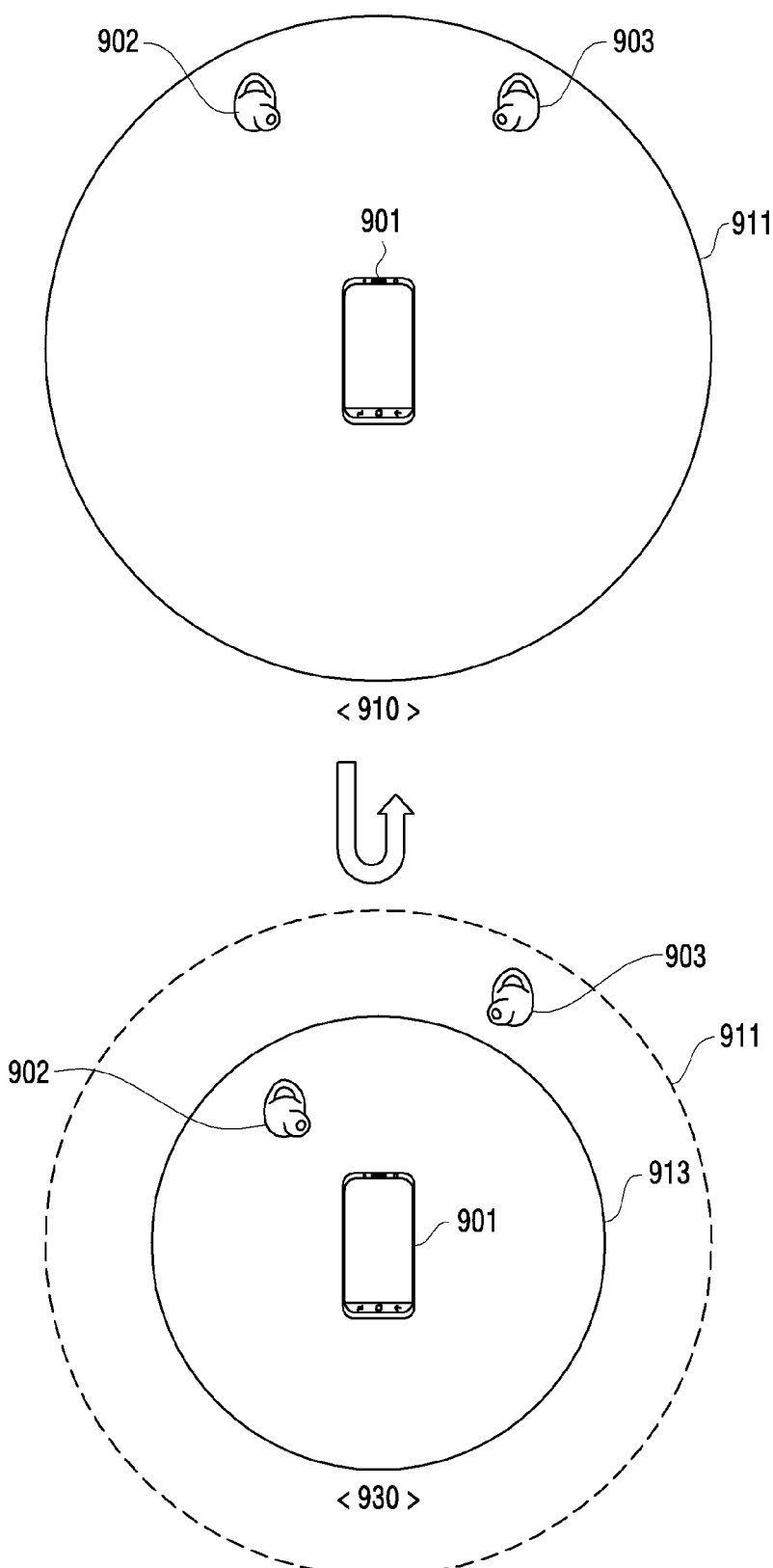
FIG. 9 illustrates a method for configuring or changing a communication link with a user device according to an embodiment.

FIG. 9 illustrates a method for configuring or changing a communication link with a user device according to an embodiment of the disclosure.

Referring to FIG. 9, in a state where a first device 902 (e.g., first device 203) is connected to a user device 901 (e.g., user device 201) via a first communication link (e.g., first communication link 211), and a second device 903 (e.g., second device 205) monitors (e.g., monitoring 215) the first communication link, the user device 901 may receive a user input for playing music. In this case, the user device 901 may transmit data of the selected music to the first device 902 via the first communication link, and the second device 903 may obtain (or receive) the data by monitoring the first communication link. Accordingly, the first device 902 and the second device 903 may output music using the obtained (or received) data. At this time, the first device 902 and the second device 903 may be located in a first data receiving area 911 according to an output power (Tx power) of the user device 901, as in a first state 910.

As in a second state 930, when the first device 902 is close to the user device 901, the first device 902 may request the user device 901 to decrease power control. At this time, the user device 901 may transmit data at a lowered output power, and the receiving area of the data may be reduced from the first data receiving area 911 to a second data receiving area 913 due to the lowered output power. In this case, since the second device 903 is located outside the second data receiving area 913, it may not be able to acquire (or receive) the data transmitted from the user device 901.

Accordingly, the first device 902 may not request the user device 901 to lower the output power so that the second device 903 can acquire data (located within the receiving area of the data), in consideration of the strength of the received signal of the second device 903 as well as the strength (RSSI) of the received signal of the first device 902. That is, as in the first state 901, not only the first device 902 but also the second device 903 may remain in the first data receiving area 911.

According to an embodiment, in the process of determining whether to change the link operation element of the user device 901 for the first communication link according to the distance (first distance) between the user device 901 and the first device 902, the distance (second distance) between the user device 901 and the second device 903 may be reflected in the determination. For example, if the second distance is less than a designated distance or the first distance, the first device 902 may change a link operation element of the user device 901 for the first communication link, based on the first distance, and if the second distance is equal to or greater than the designated distance or the first distance, the first device 902 may control not to change the link operation element of the user device 901 for the first communication link, or may control to change the link operation element of the user device 901 for the first communication link, based on the second distance.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a wireless communication circuit; and
a processor, wherein the processor is configured to:
establish a first communication link with a first external electronic device using the wireless communication circuit;
establish a second communication link with a second external electronic device using the wireless communication circuit;
transmit connection information related to the first communication link to the second external electronic device via the second communication link;
determine whether configuration information related to operation of the first communication link needs to change;
based on determination that the configuration information needs to change:
identify first operation information of the electronic device for the first communication link, and
request second operation information of the second external electronic device for the first communication link from the second external electronic device via the second communication link;
in response to reception of the second operation information, determine whether to change the configuration information, based on the first operation information and the second operation information;
in response to a determination to change the configuration information, determine a change value of the configuration information, based on the first operation information and the second operation information by:
when each of the first operation information and the second operation information is a numerical value, determining an average value of a first value indicated by the first operation information and a second value indicated by the second operation information, a smaller value between the first value and the second value, or a greater value between the first value and the second value as the change value of the configuration information; or
when each of the first operation information and the second operation information is a range value, determining a third range value corresponding to a common part between a first range value indicated by the first operation information and a second range value indicated by the second operation information as the change value of the configuration information; and
transmit the change value of the configuration information to the first external electronic device via the first communication link.

2. The electronic device of claim 1, wherein the configuration information comprises at least one of adaptive frequency hopping (AFH), power control, channel quality driven data rate change (CQDDR), link supervision timeout (LSTO), quality of service (QoS), max slot, and packet type table (PTT).

3. The electronic device of claim 1, wherein the processor is configured to determine whether the configuration information needs to change based at least on a state change of the electronic device or the first external electronic device, a state of the first communication link, or occurrence of communication failure due to an obstacle.

4. The electronic device of claim 1, wherein the processor is further configured to:
monitor the first communication link by the second external electronic device, based on the connection information,
determine the second external electronic device is unable to receive data transmitted from the first external electronic device via the first communication link, and
based on the determination that the second external electronic device is unable to receive data, not transmit the change value of the configuration information to the first external electronic device.

5. The electronic device of claim 4, wherein the processor is configured to, based on a value indicated by the second operation information being out of a range indicated by the change value of the configuration information, determine that the second external electronic device is unable to receive data transmitted from the first external electronic device via the first communication link.

6. An electronic device comprising:
a wireless communication circuit; and
a processor,
wherein the processor is configured to:
establish a first communication link with a first external electronic device using the wireless communication circuit;
receive connection information related to a second communication link established between the first external electronic device and a second external electronic device via the first communication link;
monitor the second communication link, based on the received connection information;
receive a request for sharing first operation information of the electronic device for the second communication link via the first communication link;
transmit the first operation information to the first external electronic device via the first communication link;
determine whether configuration information related to operation of the second communication link needs to change;
based on a determination that the configuration information needs to change:
identify the first operation information, and
request second operation information of the first external electronic device for the second communication link from the first external electronic device via the first communication link;
in response to reception of the second operation information, determine whether to change the configuration information, based on the first operation information and the second operation information;
in response to a determination to change the configuration information, determine a change value of the configuration information, based on the first operation information and the second operation information by:
when each of the first operation information and the second operation information is a numerical value, determining an average value of a first value indicated by the first operation information and a second value indicated by the second operation information, a smaller value between the first value and the second value, or a greater value between the first value and the second value as the change value of the configuration information; or
when each of the first operation information and the second operation information is a range value, determining a third range value corresponding to a common part between a first range value indicated by the first operation information and a second range value indicated by the second operation information as the change value of the configuration information; and transmit the change value of the configuration information to the second external electronic device, based on the connection information.

7. The electronic device of claim 6, wherein the connection information comprises at least one of address information of the electronic device, address information of the first external electronic device, piconet clock information, logical transport address information, used channel map information, link key information, service discovery protocol (SDP) information, supported feature information, and extended inquiry response (EIR) packet, and wherein the processor is configured to calculate a channel access code and a hopping frequency of the second communication link, based on the connection information, and monitor the second communication link, based on the channel access code and the hopping frequency.

8. The electronic device of claim 6, wherein the processor is configured to:

establish a third communication link with the second external electronic device using the wireless communication circuit; and receive the connection information related to the second communication link from the second external electronic device via the third communication link.

9. The electronic device of claim 8, wherein the processor is configured to release a connection to the third communication link, based on determination that the connection information has been received via the third communication link.

10. A method for configuring a wireless communication link, the method comprising:

establishing a first communication link, by a user device and a first device;

establishing a second communication link, by the first device and a second device;

transmitting, by the first device, connection information related to the first communication link to the second device via the second communication link;

monitoring, by the second device, the first communication link, based on the connection information;

determining, by the first device, whether configuration information related to operation of the first communication link needs to change;

based on determination that the configuration information needs to change, identifying first operation information of the first device for the first communication link, and requesting second operation information of the second device for the first communication link from the second device via the second communication link, by the first device;

in response to the first device receiving the second operation information from the second device, determining, by the first device, whether to change the configuration information, based on the first operation information and the second operation information;

determining, by the first device, a change value of the configuration information, based on the first operation information and the second operation information, on basis of determining to change the configuration information; and transmitting, by the first device, the change value of the configuration information to the user device through the first communication link, wherein the determining of the change value of the configuration information comprises:

when each of the first operation information and the second operation information is a numerical value, determining an average value of a first value indicated by the first operation information and a second value indicated by the second operation information, a smaller value between the first value and the second value, or a greater value between the first value and the second value as the change value of the configuration information; or when each of the first operation information and the second operation information is a range value, determining a third range value corresponding to a common part of a first range value indicated by the first operation information and a second range value indicated by the second operation information as the change value of the configuration information.

11. The method of claim 10, wherein the configuration information comprises at least one of adaptive frequency hopping (AFH), power control, channel quality driven data rate change (CQDDR), link supervision timeout (LSTO), quality of service (QoS), max slot, and packet type table (PTT).

12. The method of claim 10, wherein the determining of whether the configuration information needs to change comprises determining whether the configuration information needs to change based at least on a state change of the user device or the first device, a state of the first communication link, or occurrence of communication failure due to an obstacle.

13. The method of claim 10, further comprising:

monitoring the first communication link by the second device, based on the connection information;

based on the monitoring the first communication link, determining that the second device is unable to receive data transmitted from the user device via the first communication link; and based on the determining that the second device is unable to receive data controlling the change value of the configuration information not to be transmitted to the user device.

14. The method of claim 13, further comprising:

based on a value indicated by the second operation information being out of a range indicated by the change value of the configuration information, determining that the second device is unable to receive data transmitted from the user device via the first communication link.

15. The method of claim 10, wherein the connection information comprises at least one of address information of the user device, address information of the first device, piconet clock information, logical transport address information, used channel map information, link key information, service discovery protocol (SDP) information, supported feature information, and extended inquiry response (EIR) packet, and wherein the monitoring comprises:

calculating a channel access code and a hopping frequency of the first communication link, based on the connection information; and monitoring the first communication link, based on the channel access code and the hopping frequency.

16. The method of claim 10, further comprising:

determining, by the second device, whether the configuration information related to the operation of the first communication link needs to change;

based on determining that the configuration information needs to change, identifying the second operation information and requesting first operation information from the first device via the second communication link, by the second device;

in response to the second device receiving the first operation information from the first device, determining, by the second device, whether to change the configuration information, based on the first operation information and the second operation information;

determining, by the second device, a change value of the configuration information, based on the first operation information and the second operation information, on basis of determining to change the configuration information; and transmitting, by the second device, the change value of the configuration information to the user device, based on the connection information.

17. The method of claim 10, further comprising:

determining, by the user device, whether the configuration information related to the operation of the first communication link needs to change;

based on determining that the configuration information needs to change, determining, by the user device, a change value of the configuration information; and transmitting, by the user device, the change value of the configuration information to the first device via the first communication link.

18. An electronic device comprising:
a wireless communication circuit; and
a processor, wherein the processor is configured to:
establish a first communication link with a first external electronic device using the wireless communication circuit;
establish a second communication link with a second external electronic device using the wireless communication circuit;
transmit, via the second communication link, connection information related to the first communication link to the second external electronic device so that the second external electronic device monitors the first communication link;
 identify first information related to operation of the electronic device for the first communication link, and
 request to receive, via the second communication link, second information related to the monitoring of the second external electronic device for the first communication link from the second external electronic device;
in response to reception of the second information, determine whether to change configuration information related to operation of the first communication link, based on the first information and the second information; and
based on determination that the configuration information is changed:
 determine a change value of the configuration information, based on the first information and the second information, and
 transmit, via the first communication link, the change value of the configuration information to the first external electronic device,
wherein the second information indicates a state of a link operation element associated with the first communication link, the state of the link operation element being configurable for the second external electronic device to monitor the first communication link.

19. The electronic device of claim 18, wherein the configuration information comprises at least one of adaptive frequency hopping (AFH), power control, channel quality driven data rate change (CQDDR), link supervision timeout (LSTO), quality of service (QOS), max slot, packet type table (PTT), entrance of a sniff mode, and open channel for a call.

20. The electronic device of claim 18, wherein the processor is configured to determine whether the configuration information needs to change based at least on a state change of the electronic device or the first external electronic device, a state of the first communication link, or occurrence of communication failure due to an obstacle.

21. The electronic device of claim 18, wherein the processor is configured to determine the change value of the configuration information by:
when each of the first information and the second information is a numerical value, determining an average value of a first value indicated by the first information and a second value indicated by the second information, a smaller value between the first value and the second value, or a greater value between the first value and the second value as the change value of the configuration information; or
when each of the first information and the second information is a range value, determining a third range value corresponding to a common part between a first range value indicated by the first information and a second range value indicated by the second information as the change value of the configuration information.

22. An electronic device comprising:
a wireless communication circuit; and
a processor,
wherein the processor is configured to:
establish a first communication link with a first external electronic device using the wireless communication circuit;
receive, via the first communication link, connection information related to a second communication link established between the first external electronic device and a second external electronic device;
monitor the second communication link, based on the received connection information;
receive, via the first communication link, a request for the first external electronic device to receive first information related to the monitoring that the electronic device performs for the second communication link; and
transmit, via the first communication link, the first information to the first external electronic device,
wherein the first information indicates a state of a link operation element associated with the second communication link, the state of the link operation element being configurable for the electronic device to monitor the second communication link.

23. The electronic device of claim 22, wherein the connection information comprises at least one of address information of the electronic device, address information of the first external electronic device, piconet clock information, logical transport address information, used channel map information, link key information, service discovery protocol (SDP) information, supported feature information, and extended inquiry response (EIR) packet, and
 wherein the processor is configured to calculate a channel access code and a hopping frequency of the second communication link, based on the connection information, and monitor the second communication link, based on the channel access code and the hopping frequency.

24. The electronic device of claim 22, wherein the processor is configured to:
identify the first information, and
request, via the first communication link, second information related to operation of the first external electronic device for the second communication link from the first external electronic device;
in response to reception of the second information, determine whether to change configuration information related to operation of the second communication link, based on the first information and the second information; and
based on determination that the configuration information is changed:
determine a change value of the configuration information, based on the first information and the second information, and
transmit the change value of the configuration information to the second external electronic device, based on the connection information.

25. The electronic device of claim 24, wherein the processor is configured to determine the change value of the configuration information by:
when each of the first information and the second information is a numerical value, determining an average value of a first value indicated by the first information and a second value indicated by the second information, a smaller value between the first value and the second value, or a greater value between the first value and the second value as the change value of the configuration information; or
when each of the first information and the second information is a range value, determining a third range value corresponding to a common part between a first range value indicated by the first information and a second range value indicated by the second information as the change value of the configuration information.

* * * * *